US012323767B2

(12) United States Patent
De Haan et al.

(10) Patent No.: US 12,323,767 B2
(45) Date of Patent: Jun. 3, 2025

(54) HEARING SYSTEM COMPRISING A DATABASE OF ACOUSTIC TRANSFER FUNCTIONS

(71) Applicant: Oticon A/S, Smørum (DK)

(72) Inventors: Jan M. De Haan, Smørum (DK); Jesper Jensen, Smørum (DK); Michael Syskind Pedersen, Smørum (DK); Svend Feldt, Ballerup (DK); Stig Petri, Ballerup (DK); Jakob Sloth Lauridsen, Smørum (DK)

(73) Assignee: OTICON A/S, Smørum (DK)

( * ) Notice: Subject to any disclaimer, the term of this patent is extended or adjusted under 35 U.S.C. 154(b) by 0 days.

(21) Appl. No.: 18/759,161

(22) Filed: Jun. 28, 2024

(65) Prior Publication Data

US 2024/0357296 A1 Oct. 24, 2024

Related U.S. Application Data

(63) Continuation of application No. 17/890,647, filed on Aug. 18, 2022, now Pat. No. 12,063,477.

(30) Foreign Application Priority Data

Aug. 20, 2021 (EP) .................................... 21192443

(51) Int. Cl.

*H04R 25/00* (2006.01)
*H04R 1/40* (2006.01)
*H04S 7/00* (2006.01)

(52) U.S. Cl.

CPC ........... *H04R 25/505* (2013.01); *H04R 1/406* (2013.01); *H04R 25/554* (2013.01); *H04S 7/302* (2013.01); *H04S 2420/01* (2013.01)

(58) Field of Classification Search

None
See application file for complete search history.

(56) References Cited

U.S. PATENT DOCUMENTS

2015/0010160 A1 1/2015 Udesen
2015/0055783 A1 2/2015 Luo et al.
(Continued)

FOREIGN PATENT DOCUMENTS

EP 2 822 301 A1 1/2015
EP 2 869 599 A1 5/2015
(Continued)

OTHER PUBLICATIONS

Extended European Search Report, issued in Priority Application No. 21192443.6, dated Mar. 1, 2022.
(Continued)

*Primary Examiner* — Kenny H Truong
(74) *Attorney, Agent, or Firm* — Birch, Stewart, Kolasch & Birch, LLP

(57) ABSTRACT

A hearing system comprises a) a multitude of M of microphones providing M corresponding electric input signals $x_m(n)$, m=1, . . . , M, and n representing time, b) a processor connected to said multitude of microphones and providing a processed signal in dependence thereof, c) an output unit for providing an output signal in dependence of said processed signal, and d) a database (Θ) comprising a dictionary ($\Delta_{pd}$) of previously determined acoustic transfer function vectors ($ATF_{pd}$). The processor is configured A) to determine a constrained estimate of a current acoustic transfer function vector ($ATF_{pd,cur}$) in dependence of said M electric input signals and said dictionary ($\Delta_{pd}$), B) to determine an unconstrained estimate of a current acoustic transfer function vector ($ATF_{uc,cur}$) in dependence of said M electric input signals, and C) to determine a resulting acoustic transfer function vector (ATF*) for a user of the hearing system in
(Continued)

dependence thereof and of a confidence measure related to said electric input signals. A method of operating a hearing device is also disclosed. Thereby an improved noise reduction system for a hearing aid or headset may be provided.

18 Claims, 9 Drawing Sheets

(56) References Cited

U.S. PATENT DOCUMENTS

2016/0112811 A1* 4/2016 Jensen ................ G10L 21/0232 381/17
2019/0378531 A1 12/2019 Jensen et al.

FOREIGN PATENT DOCUMENTS

EP 3 236 672 A1 10/2017
EP 3 413 589 A1 12/2018

OTHER PUBLICATIONS

Hoang et al., "Joint Maximum Likelihood Estimation of Power Spectral Densities and Relative Acoustic Transfer Function for Acoustic Beamforming", ICASSP 2021—2021 IEEE International Conference on Acoustics, Speech and Signal Processing (ICASSP), 2021, pp. 1-5.
Jensen et al., "Analysis of Beamformer Directed Single-Channel Noise Reduction System for Hearing Aid Applications", 2015 IEEE International Conference on Acoustics, Speech and Signal Processing (ICASSP), 2015, pp. 5728-5732.
Markovich-Golan et al., "Performance Analysis of the Covariance Subtraction Method for Relative Transfer Function Estimation and Comparison to the Covariance Whitening Method", 2015 IEEE International Conference on Acoustics, Speech and Signal Processing (ICASSP), 2015, pp. 544-548.
Ye et al., "Maximum Likelihood DOA Estimation and Asymptotic Cramér-Rao Bounds for Additive Unknown Colored Noise", IEEE Transactions on Signal Processing, vol. 43, No. 4, Apr. 1995, pp. 938-949.
Zohourian et al., "Binaural Speaker Localization Integrated Into an Adaptive Beamformer for Hearing Aids", IEEE/ACM Transactions on Audio, Speech, and Language Processing, vol. 26, No. 3, Mar. 2018, pp. 515-528.

* cited by examiner

HEARING SYSTEM COMPRISING A DATABASE OF ACOUSTIC TRANSFER FUNCTIONS

This application is a Continuation of copending application Ser. No. 17/890,647, filed on Aug. 18, 2022, which claims priority under 35 U.S.C. § 119(a) to Application No. 21192443.6, filed in Europe on Aug. 20, 2021, all of which are hereby expressly incorporated by reference into the present application.

TECHNICAL FIELD

The present disclosure relates to a hearing system, e.g. comprising one or more hearing devices, e.g. headsets, earphones or hearing aids, in particular to individualization of a multi-channel noise reduction system exploiting and extending a database comprising a dictionary of acoustic transfer functions, e.g. relative acoustic transfer functions (RATF). The present disclosure further relates to an equivalent method of operating a hearing system.

An essential part of a multi-channel noise reduction systems (such as minimum variance distortionless response (MVDR), Multichannel Wiener Filter (MWF), etc.) in hearing devices is to have access to relative acoustic transfer function RATF for the source of interest. Any mismatch between the true RATF and the RATF employed in the noise reduction system may lead to distortion and/or suppression of the signal of interest.

SUMMARY

A Hearing System:

In an aspect of the present application, a hearing system (e.g. comprising at least one hearing device, e.g. a hearing aid) configured to be worn by a user. The hearing system comprises

- a microphone system comprising a multitude of M of microphones, where M is larger than or equal to two, the microphone system being adapted for picking up sound from the environment and to provide M corresponding electric input signals $x_m(n)$, m=1, . . . , M, and n representing time, the environment sound at an $m^{th}$ microphone comprising a target sound signal propagated from a target sound source to the $m^{th}$ microphone of the hearing system when worn by the user,
- a processor connected to said multitude of microphones, the processor being configured to process said M electric input signals and to provide a processed signal in dependence thereof,
- an output unit for providing an output signal in dependence of said processed signal, and a database (Θ) comprising a dictionary ($\Delta_{pd}$) of previously determined acoustic transfer function vectors ($ATF_{pd}$), whose elements $ATF_{pd,m}$, m=1, . . . , M, are frequency dependent acoustic transfer functions representing location-dependent (θ) and frequency dependent (k) propagation of sound from a location (θj) of the target sound source to each of said M microphones, k being a frequency index, k=1, . . . , K, where K is a number of frequency bands, when said microphone system is mounted on a head at or in an ear of a natural or artificial person, and wherein said dictionary $\Delta_{pd}$ comprises acoustic transfer function vectors for said natural or for said artificial person for a multitude (J) of different locations θj, j=1, . . . , J, relative to the microphone system.

The processor may be configured

- to determine a constrained estimate of a current acoustic transfer function vector ($ATF_{pd,cur}$) in dependence of (current values of) said M electric input signals and said dictionary ($\Delta_{pd}$) of previously determined acoustic transfer function vectors ($ATF_{pd}$),
- to determine an unconstrained estimate of a current acoustic transfer function vector ($ATF_{uc,cur}$) in dependence of (current values of) said M electric input signals, and
- to determine a resulting acoustic transfer function vector (ATF*) (for said user) in dependence of
  - said constrained estimate of a current acoustic transfer function vector ($ATF_{pd,cur}$),
  - said unconstrained estimate of a current acoustic transfer function vector ($ATF_{uc,cur}$), and
  - of a confidence measure related to (current values of) said electric input signals.

The processor may be further configured to

- provide said processed signal in dependence of said resulting acoustic transfer function vector (ATF*) (for said user).

Thereby an improved noise reduction system may be provided.

The present disclosure relates to dynamically estimating appropriate acoustic transfer functions during use of a hearing device, e.g. to account for possible changes in distances between microphones, different placement of the hearing device on the user's head, resulting in different locations of the microphones relative to a target sound source (e.g. the use user's mouth), etc.

The term 'current values of the electric input signals' is intended to mean values of the signals during (normal) use of the hearing system.

The term 'unconstrained' is in the present context taken to mean that the estimate of a current value of an acoustic transfer function vector ($ATF_{uc,cur}$) is independent of the stored (previously determined) values of acoustic transfer function vectors ($ATF_{pd}$) of the dictionary ($\Delta_{pd}$). The unconstrained estimate of a current acoustic transfer function vector ($ATF_{uc,cur}$) depends on current values of at least one (e.g. all) of the current electric input signals from the M microphones, and optionally on current values of other signals (e.g. from a contralateral hearing device, and/or from one or more detectors or sensors).

The term 'constrained' is in the present context taken to mean that the estimate of a current value of an acoustic transfer function vector ($ATF_{pd,cur}$) is dependent of stored (previously determined) values of acoustic transfer function vectors ($ATF_{pd}$) of the dictionary ($\Delta_{pd}$).

The 'unconstrained' estimate of a current value of an acoustic transfer function vector ($ATF_{uc,cur}$) as well as the 'constrained' estimate of a current value of an acoustic transfer function vector ($ATF_{pd,cur}$) are in the present context both (automatically) determined by the hearing device during (normal) use of the hearing device (e.g. when mounted on the user as intended, and powered up in a mode intended for use).

The confidence measure may be related to the target sound signal impinging on the microphone system, e.g. to an estimated quality of the target sound signal. The confidence measure may be related to the target signal (as captured from the target sound source by the microphone system), e.g. to an estimated quality of the target signal.

The confidence measure is intended to be automatically determined by the hearing aid during (normal) use.

The (hearing system may be configured to provide that the) confidence measure may comprise at least one of

- a target-signal-quality-measure indicative of a signal quality of a current target signal from said target sound source in dependence of (current values of) at least one of said M electric input signals or a signal or signals originating therefrom;
- respective acoustic-transfer-function-vector-matching-measures indicative of a degree of matching of said constrained estimate and said unconstrained estimate of a current acoustic transfer function vector ($ATF_{pd,cur}$, $ATF_{uc,cur}$), respectively, considering the current (values of the) electric input signals; and
- a target-sound-source-location-identifier indicative of a location of, or proximity of, the current target sound source relative to the user.

The hearing system may comprise a target signal quality estimator configured to provide said target-signal-quality-measure indicative of a signal quality of a target signal from said target sound source in dependence of (current values of) at least one of said M electric input signals or a signal or signals originating therefrom.

The signal quality estimator may be constituted by or comprises a signal-to-noise-ratio estimator. The target signal quality measure may be a signal-to-noise-ratio (SNR) of at least one of the (current values of the) M electric input signals or a signal or signals originating therefrom (e.g. a beamformed signal). The signal-to-noise-ratio (SNR) estimator may e.g. rely on the identification of a target signal source, e.g. comprising speech (e.g. from a particular direction). The signal-to-noise-ratio (SNR) estimator may e.g. comprise a voice activity detector, allowing to estimate whether or not (or with what probability) an input signal comprises a voice signal (at a given point in time). Thereby a noise level can be estimated during speech pauses. A signal-to-noise-ratio (SNR) estimator is e.g. disclosed in US20190378531A1.

Other signal quality estimators may e.g. be based on signal level estimation, speech intelligibility estimation, modulation index estimation, etc.

The hearing system may comprise an ATF-vector-comparator configured to provide an acoustic-transfer-function-vector-matching-measure indicative of a degree of matching of the constrained estimate and the unconstrained estimate of a current acoustic transfer function vector ($ATF_{pd,cur}$, $ATF_{uc,cur}$), respectively. The ATF-vector-comparator may be configured to apply a distance measure (e.g. an Euclidian distance) to the respective ATF-vectors, e.g. to compare a distance between coordinates of their end-points assuming identical starting points of the two vectors (or vice versa).

The hearing system may comprise a location estimator configured to provide said target-sound-source-location-identifier. The location estimator may be configured to provide the target-sound-source-location-identifier in dependence of at least one of

- A voice activity detector (e.g. an own voice detector) configured to estimate whether or not (or with what probability) a given input sound comprises a voice (e.g. speech) (and for an own voice detector, whether or not (or with what probability) it comprises the voice of the user of the wearable hearing system (e.g. the hearing device)), e.g. in dependence of (current values of) at least one of said M electric input signals or a signal or signals originating therefrom;
- A direction of arrival estimator configured to estimate a direction of arrival of a current target sound source, e.g. in dependence of (current values of) at least one of said M electric input signals or a signal or signals originating therefrom; and
- A proximity detector configured to estimate a distance to a current target sound source, e.g. in dependence of (current values of) at least one of said M electric input signals or a signal or signals originating therefrom, or in dependence of a distance sensor or detector.

The unconstrained estimate of the current acoustic transfer function vector ($ATF_{uc,cur}$) may be used as the resulting acoustic transfer function vector (ATF*) (for said user), if a first criterion depending on said target-signal-quality-measure is fulfilled. The hearing device may be configured to provide that the constrained estimate of the current acoustic transfer function vector ($ATF_{pd,cur}$) is used as the resulting acoustic transfer function vector (ATF*) for the user, if the first criterion depending on said target-signal-quality-measure is NOT fulfilled.

The first criterion may e.g. comprise that the target signal quality measure (TQM) is larger than a first threshold value ($TQM_{th1}$).

The unconstrained estimate of the current acoustic transfer function vector ($ATF_{uc,cur}$) may be used as the resulting acoustic transfer function vector (ATF*) (for said user), if a first criterion depending on said acoustic-transfer-function-vector-matching-measures is fulfilled. The first criterion may e.g. comprise that the acoustic-transfer-function-vector-matching-measure ($ATF\text{-}MM_{uc}$) for the unconstrained estimate of a current acoustic transfer function vector is larger than the acoustic-transfer-function-vector-matching-measure ($ATF\text{-}MM_{pd}$) for the constrained estimate of a current acoustic transfer function vector, e.g. the difference is larger than a minimum value (e.g. $\Delta ATF = ATF\text{-}MM_{uc} - ATF\text{-}MM_{pd}) \geq 10\%$, e.g. 10% of $ATF\text{-}MM_{pd}$). A large value of a respective acoustic-transfer-function-vector-matching-measure ($ATF\text{-}MM_{uc}$, $ATF\text{-}MM_{pd}$) is intended to reflect a high degree of matching. The acoustic-transfer-function-vector-matching-measure(s) may assume values between 0 and 1 and reflect a degree of matching ('1' being e.g. associated with perfect matching).

The first criterion may depend on the target-signal-quality-measure AND the acoustic-transfer-function-vector-matching-measures.

The first criterion may depend on the target-signal-quality-measure AND the target-sound-source-location-identifier.

The first criterion may depend on the acoustic-transfer-function-vector-matching-measures AND the target-sound-source-location-identifier.

The first criterion may depend on the target-signal-quality-measure AND the acoustic-transfer-function-vector-matching-measures AND the target-sound-source-location-identifier.

The resulting acoustic transfer function vector (ATF*) for the user may be determined as a mixture of said constrained estimate of the current acoustic transfer function vector ($ATF_{pd,cur}$) and said unconstrained estimate of the current acoustic transfer function vector ($ATF_{uc,cur}$) in dependence of said target signal quality measure and/or said acoustic-transfer-function-vector-matching-measure. The mixture may be a weighted mixture. The target signal quality measure (TQM) and/or the acoustic-transfer-function-vector-matching-measures ($ATF\text{-}MM_{uc}$, $ATF\text{-}MM_{pd}$) may be normalized (N) to take on values only in an interval between 0 and 1 (i.e. $0 \leq TQM_N \leq 1$; $0 \leq ATF\text{-}MM_{uc,N} \leq 1$; $0 \leq ATF\text{-}MM_{pd,N} \leq 1$), where 1 represents a high signal quality or degree of matching and 0 represents a low target signal quality or degree of matching, respectively. The resulting acoustic transfer function vector (ATF*) (for given electric input signals at a given point in time) may e.g. be determined as $ATF^{*}=ATF_{uc,cur}\text{-}TQM_{N}+ATF_{pd,cur}\text{-}(1-TQM_{N})$, when the mixture is exemplified by a dependence of the target signal quality measure ($TQM_{N}$) (only).

The database (Θ) may comprise a sub-dictionary ($\Delta_{pd,std}$) of previously determined, standard acoustic transfer function vectors ($ATF_{pd,std}$). The sub-dictionary ($\Delta_{pd,std}$) of previously determined, standard acoustic transfer function vectors ($ATF_{pd,std}$) may e.g. comprise non-personalized acoustic transfer function vectors, e.g. from a standard database (like the KEMAR HRTF database of [Gardner and Martin, 1994]), e.g. recorded using a model of a human head (e.g. the Head and Torso Simulator (HATS) 4128C from Brüel & Kjær Sound & Vibration Measurement A/S, or the head and torso model KEMAR from GRAS Sound and Vibration A/S, or recorded on one or more natural persons (e.g. not including the user), or a mixture thereof.

The unconstrained estimate of the current acoustic transfer function vector ($ATF_{uc,cur}$) may be stored in a sub-dictionary ($\Delta_{pd,tr}$) of said database, if a second criterion is fulfilled. The second criterion may e.g. depend on the target signal quality measure and/or the acoustic-transfer-function-vector-matching-measure (and possibly further parameters, e.g. the target-sound-source-location-identifier). The second criterion may e.g. comprise that the target signal quality measure is larger than a second threshold value ($TQM_{th2}$). The first and second criteria may be identical (e.g. in that $TQM_{th2}=TQM_{th1}$). The first and second criteria may, however, be different. The second criterion may e.g. be more restrictive than the first criterion (e.g. in that the second threshold value is larger than the first threshold value, $TQM_{th2}>TQM_{th1}$). The unconstrained estimate of a current acoustic transfer function vector ($ATF_{uc,cur}$) is not stored in the database in case the criterion, e.g. the criterion depending on the target signal quality measure (TQM), is not fulfilled (e.g. if the target signal quality measure (TQM) is smaller than the second threshold value). The unconstrained estimate of a current acoustic transfer function vector ($ATF_{uc,cur}$), e.g. a relative acoustic transfer function, $RATF_{uc,cur}$, e.g. estimated at high SNRs (e.g. SNR>30 dB, or SNR>40 dB), may e.g. be stored as a new dictionary element $ATF_{pd,tr}$, which will then be available as a plausible acoustic transfer function (ATF, e.g. a RATF) in the dictionary $\Delta_{pd}$ of stored (previously determined) acoustic transfer function vectors ($ATF_{pd}$). The dictionary $\Delta_{pd}$ hence comprises sub-dictionaries ($\Delta_{pd,std}$) (standard (std), non-personalized) and ($\Delta_{pd,tr}$) (which are personalized, 'trained' (tr), cf. e.g. FIG. 3). A criterion depending on said target signal quality measure may thus be expressed as: If $TQM>TQM_{th2}$, store the unconstrained current acoustic transfer function vector ($ATF_{tr,cur}$) (as a 'previously determined', personalized (trained) acoustic transfer function vector ($ATF_{pd,tr}$), otherwise don't store, or store in a separate dictionary (($\Delta_{log}$) e.g. for logging purposes). Thereby a sub-dictionary ($\Delta_{pd,tr}$) of the database (Θ) comprising personalized (trained on the user) acoustic transfer function vector ($ATF_{pd,tr}$) can be built during use of the hearing device. These 'previously determined' personalized (trained) acoustic transfer function vectors ($ATF_{pd,tr}$) may then (together with the previously determined, standard acoustic transfer function vectors ($ATF_{pd,std}$) of the sub-dictionary ($\Delta_{pd,std}$)) form part of the of dictionary $\Delta_{pd}$ of stored 'previously determined' acoustic transfer function vectors ($ATF_{pd}$) and hence be used to determine a constrained estimate of a current acoustic transfer function vector ($ATF_{pd,cur}$) in dependence of the current electric input signals, cf. e.g. FIG. 4B.

The dictionary elements that are allowed to be updated (trained ($ATF_{pd,tr}$)) can hence be regarded as additional dictionary elements (of an (adaptively changing) sub-dictionary ($\Delta_{pd,tr}$)). In other words, a base of (possibly predetermined, standard) dictionary elements ($ATF_{pd,std}$) of a sub-dictionary ($\Delta_{pd,std}$) may always kept, while dictionary elements ($ATF_{pd,tr}$) of a sub-dictionary ($\Delta_{pd,tr}$) are allowed to be updated/generated. The keeping of the elements of sub-dictionary ($\Delta_{pd,std}$) may be practical in order to guarantee reasonable performance, even if erroneous dictionary elements are included in the adaptively updated (personalized) sub-dictionary ($\Delta_{pd,tr}$).

The unconstrained estimate of the current acoustic transfer function vector ($ATF_{tr,cur}$) may be assigned a target location ($\theta^{*}_{j}$) in dependence of its proximity to the existing dictionary elements ($ATF_{pd}(\theta_{j})$). The unconstrained estimate of the current acoustic transfer function vector ($ATF_{tr,cur}$) may e.g. be assigned the target location ($\theta^{*}_{j}$) of the existing dictionary element ($ATF_{pd}(\theta^{*}_{j})$) that has the smallest difference to the unconstrained estimate of the current acoustic transfer function vector ($ATF_{tr,cur}$). The distance may e.g. be determined as or based on the mean-square error (MSE), or other distance measures allowing a ranking of vectors in order of similarity (proximity). The current acoustic transfer function vector ($ATF_{tr,cur}$) may be assigned a target location ($\theta^{*}_{j}$) in dependence of its proximity to the existing dictionary elements ($ATF_{pd}(\theta^{*}_{j})$) being smaller than a threshold value.

A target location (θ*) of the target sound source of current interest to the user may be independently estimated for the unconstrained estimate of the current acoustic transfer function vector ($ATF_{tr,cur}$). The target location (θ*) of the target sound source of current interest to the user may be estimated by prior art sound source location algorithms. The target location (θ*) of the target sound source of current interest to the user may alternatively or additionally be indicated by the user via a user interface. The target location (θ*) may be fed to one or more algorithms of the processor.

The previously determined acoustic transfer function vectors ($ATF_{pd}$) of the dictionary ($\Delta_{pd}$) may be ranked in dependence of their frequency of use. The processor may be configured to log the use of the previously determined acoustic transfer function vectors ($ATF_{pd}$) of the dictionary ($\Delta_{pd}$) (and thus be able to provide a (historic) frequency of use at a given time). The processor may be configured to log the use of the previously determined (personalized) additional dictionary elements ($ATF_{pd,tr}$) of the sub-dictionary ($\Delta_{pd,tr}$) (and thus be able to provide a (historic) frequency of use at a given time). Thereby an improved scheme for storing new dictionary elements in the sub-dictionary ($\Delta_{pd,tr}$) may be provided. The lowest ranking elements may e.g. be deleted, when a certain number of elements have been included in the personalized sub-dictionary ($\Delta_{pd,tr}$). Thereby a qualified criterion may be provided to limit the number of additional elements in the personalized sub-dictionary ($\Delta_{pd,tr}$). The processor may further be configured to provide a frequency of use of the previously determined (standard) dictionary elements ($ATF_{pd,std}$) of the sub-dictionary ($\Delta_{pd,std}$). A comparison of the frequency of use of corresponding dictionary elements of the standard and personalized sub-dictionaries ($\Delta_{pd,std}$, $\Delta_{pd,tr}$) may be provided (e.g. logged). Based thereon conclusions regarding the relevance of the standard and/or personalized elements can be drawn.

The number of elements in the standard and personalized sub-dictionaries ($\Delta_{pd,std}$, $\Delta_{pd,tr}$) may e.g. be controlled via the ranking procedure. The lowest ranking elements (e.g. elements being ranked below a certain number of maximum stored elements (either in total, or per sub-dictionary)) may e.g. be deleted. This clean-up process may be automatically or manually executed, the latter e.g. performed by the user or by a hearing care professional).

Frequency of use (or ranking based thereon) may be used for labelling the dictionary elements the standard and personalized sub-dictionaries ($\Delta_{pd,std}$, $\Delta_{pd,tr}$), e.g. instead of or in addition to the location parameter (θ).

Other measures for labelling the dictionary elements may be used, however. Such other measure may e.g. be proximity to existing dictionary elements. Proximity between acoustic transfer function vectors may e.g. be determined by comparing their respective 'directions' and possibly length (in an M-dimensional space, e.g. 2 or 3 or higher for M=2 or 3 or higher). Criteria for including or not may relate to a degree of diversity (vectors that are parallel to an existing vector and possibly having the same length may e.g. not stored, whereas vectors that are orthogonal to existing vectors of the dictionary may be stored. Criteria therebetween for storing or not storing new dictionary elements may be envisioned.

In an embodiment, the (standard) dictionary ($\Delta_{pd}$) may be empty from the beginning of its use, so that all dictionary elements are learned during use. This may e.g. be relevant for applications for which an estimated 'personalization' is difficult to provide, e.g. for a speakerphone that should be adapted to a specific location (e.g. a room).

The acoustic transfer function vectors (ATF) of the database (Θ) may be or comprise relative acoustic transfer function vectors (RATF).

The hearing system may comprise at least one hearing device configured to be worn on the head at or in an ear of a user of the hearing system. The hearing system may be wearable by the user, e.g. adapted to be worn on the head of the user.

The hearing system or the hearing device may be constituted by or comprise an air-conduction type hearing aid, a bone-conduction type hearing aid, a cochlear implant type hearing aid, or a combination thereof. The output unit may comprise an output transducer, e.g. a loudspeaker of an air-conduction type hearing aid, or a vibrator of a bone conduction type hearing aid. The output unit may comprise a multi-electrode of a cochlear implant type hearing aid for electric stimulation of the cochlear nerve.

The hearing system or the hearing device may be constituted by or comprise a hearing aid or a headset, or a combination thereof. The output unit may be configured to provide a stimulus perceivable by the user as an acoustic signal in dependence of the processed signal (e.g. in a hearing aid). The output unit may comprise a transmitter for transmitting the processed signal to another device or system (e.g. in a headset, or in a telephone mode of a hearing aid).

The hearing system may comprise left and right hearing devices and comprise antenna and transceiver circuitry configured to allow an exchange of data between the left and right hearing devices. The hearing system may comprise or constitute a binaural hearing system, e.g. a binaural hearing aid system.

The unconstrained estimate of the current acoustic transfer function vector ($ATF_{uc,cur}$) is determined in each of the left and right hearing devices and stored in said database(s) jointly in dependence of a common criterion regarding at least one of said target signal quality measure(s), said acoustic-transfer-function-vector-matching-measure, and said target-sound-source-location-identifier.

In a further aspect, a hearing system comprising a hearing device as described above, in the 'detailed description of embodiments', and in the claims, AND an auxiliary device is moreover provided.

The hearing system may be adapted to establish a communication link between the hearing device and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing device(s). The function of a remote control may be implemented in a smartphone, the smartphone possibly running an APP allowing to control the functionality of the hearing device or hearing system via the smartphone (the hearing device(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

The hearing device, e.g. a hearing aid, may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing device may comprise a signal processor for enhancing the input signals and providing a processed output signal.

The hearing device may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid or a headset). The output transducer may comprise a vibrator for providing the stimulus as mechanical vibration of a skull bone to the user (e.g. in a bone-attached or bone-anchored hearing aid).

The hearing device may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing device may comprise a directional microphone system adapted to spatially filter sounds from the environment, and thereby enhance a target acoustic source among a multitude of acoustic sources in the local environment of the user wearing the hearing device. The directional system may be adapted to detect (such as adaptively detect) from which direction a particular part of the microphone signal originates. This can be achieved in various different ways as e.g. described in the prior art. In hearing aids or headsets, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing device may comprise antenna and transceiver circuitry allowing a wireless link to an entertainment device (e.g. a TV-set), a communication device (e.g. a telephone), a wireless microphone, or another hearing device, etc. The hearing device may thus be configured to wirelessly receive a direct electric input signal from another device. Likewise, the hearing device may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing device can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing device may constitute or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 500 g (e.g. a headset), e.g. less than 100 g, such as less than 20 g (e.g. a hearing aid). The hearing device may e.g. have maximum dimensions less than 0.2 m, e.g. less than 0.1 m, such as less than 0.05 m.

The hearing device may comprise a 'forward' (or 'signal') path for processing an audio signal between an input and an output of the hearing device. A signal processor may be located in the forward path. The signal processor may be adapted to provide a frequency dependent gain according to a user's particular needs (e.g. hearing impairment) and/or to improve a target signal in a noisy environment. The hearing device may comprise an 'analysis' path comprising functional components for analyzing signals and/or controlling processing of the forward path. The hearing device (e.g. a headset) may comprise a 'microphone path' (e.g. for transmitting a sound picked up by the microphone(s) to a remote device) and a (e.g. separate) 'loudspeaker path' (e.g. for receiving an audio signal from a remote device and play it for the user). Some or all signal processing of the analysis path and/or the forward path and/or the microphone and/or loudspeaker paths may be conducted in the frequency domain, in which case the hearing aid comprises appropriate analysis and synthesis filter banks. Some or all signal processing of the analysis path and/or the forward path and/or the microphone and/or loudspeaker paths may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. The hearing device may comprise a digital-to-analogue (DA) converter to convert a digital signal to an analogue output signal, e.g. for being presented to a user via an output transducer.

The hearing device, e.g. the input unit, and or the antenna and transceiver circuitry may comprise a transform unit for converting a time domain signal to a signal in the transform domain (e.g. frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device (e.g. another hearing aid or another earpiece of a headset), a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing device may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing device may comprise an own voice detector for estimating whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing device.

The classification unit may be based on or comprise a neural network, e.g. a trained neural network, e.g. a recurrent neural network, such as a gated recurrent unit (GRU).

The hearing device may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing device may further comprise other relevant functionality for the application in question, e.g. level compression, noise reduction, active noise cancellation, etc.

The hearing device may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing device as described above, in the 'detailed description of embodiments' and in the claims, is moreover provided. Use may be provided in a system comprising one or more hearing devices (e.g. hearing instruments), headsets, earphones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing system, e.g. comprising at least one hearing device configured to be worn on the head at or in an ear of a user is furthermore provided by the present application. The hearing system may comprise a microphone system comprising a multitude of M of microphones, where M is larger than or equal to two, the microphone system being adapted for picking up sound from the environment, and an output unit for providing an output signal in dependence of a processed signal.

The method may comprise providing M electric input signals representing sound in the environment at an $m^{th}$ microphone and comprising a target sound signal propagated from a target sound source to the $m^{th}$ microphone of the hearing aid when worn by the user, and processing said M electric input signals to provide said processed signal in dependence thereof, and providing a database Θ comprising a dictionary $\Delta_{pd}$ of previously determined acoustic transfer function vectors ($ATF_{pd}$), whose elements $ATF_{pd,m}$, m=1, . . . , M, are frequency dependent acoustic transfer functions representing location-dependent (θ), and frequency dependent (k) propagation of sound from a location (θj) of a target sound source to each of said M microphones, k being a frequency index, k=1, . . . , K, where K is a number of frequency bands, when said microphone system is mounted on a head at or in an ear of a natural or artificial person, and wherein said dictionary $\Delta_{pd}$ comprises acoustic transfer function vectors for said natural or for said artificial person for a multitude (J) of different locations θj, j=1, . . . , J, relative to the microphone system.

The method may further comprise determining a constrained estimate of a current acoustic transfer function vector ($ATF_{pd,cur}$) in dependence of (current values of) said M electric input signals and said dictionary $\Delta_{pd}$ of previously determined acoustic transfer function vectors ($ATF_{pd}$);

determining an unconstrained estimate of a current acoustic transfer function vector ($ATF_{uc,cur}$) in dependence of (current values of) said M electric input signals; and determining a resulting acoustic transfer function vector (ATF*) (for said user) in dependence of said constrained estimate of a current acoustic transfer function vector ($ATF_{pd,cur}$);

said unconstrained estimate of a current acoustic transfer function vector ($ATF_{uc,cur}$); and of a confidence measure related to (current values of) said electric input signals.

The method may further comprise providing said processed signal in dependence of said resulting acoustic transfer function vector (ATF*) (for said user).

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The method may comprise that the confidence measure (is determined by said hearing system and) comprises at least one of a target-signal-quality-measure indicative of a signal quality of a current target signal from said target sound source in dependence of (current values of) at least one of said M electric input signals or a signal or signals originating therefrom;

respective acoustic-transfer-function-vector-matching-measures indicative of a degree of matching of said constrained estimate and said unconstrained estimate of a current acoustic transfer function vector ($ATF_{pd,cur}$, $ATF_{uc,cur}$), respectively, considering (current values of) the current electric input signals; and a target-sound-source-location-identifier indicative of a location of, or proximity of, the current target sound source relative to the user.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

An APP:

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. The APP may be configured to run on cellular phone, e.g. a smartphone, or on another portable device allowing communication with said hearing aid or said hearing system.

Embodiments of the disclosure may e.g. be useful in applications such as hearing aids or headsets or table- or wireless microphones or microphone systems, e.g. speakerphones.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1:
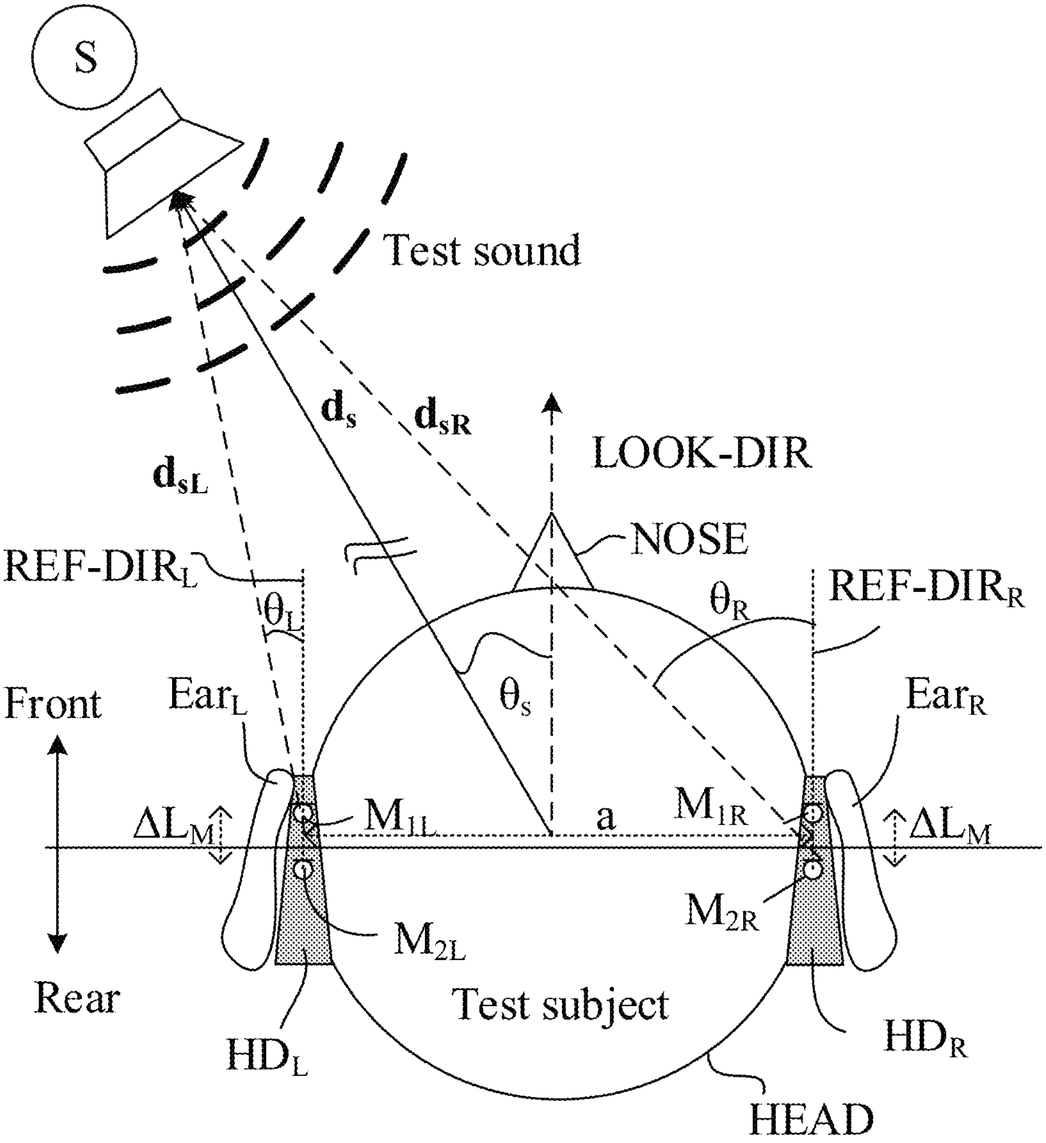
FIG. 1 schematically illustrates a typical geometrical setup of a user wearing a binaural hearing system in an environment comprising a (point) source in a front half plane of the user, FIG. 2 schematically illustrates a head of a person (or other test subject, e.g. a mannequin) wearing a hearing system comprising left and right hearing instruments, wherein the left and right hearing instruments are mounted as intended (to have its microphone axis parallel to a horizontal reference direction $\theta_s=0$), and where the test sound is positioned at a multitude J of locations on a sphere (represented by angles $\theta_j$, j=1, . . . , J) in a horizontal plane relative to the centre of the persons head, FIG. 3 schematically illustrates for a given test object (e.g. a natural or artificial person), a combination of measurements of acoustic transfer functions $ATF_{pd,std}$ for different locations ($\theta_j$, j=1, . . . , J) of the sound source, and for each location of the microphones (index m, m=1, . . . , M) of a hearing instrument or hearing system, and for each frequency index (k, k=1, . . . , K), and corresponding 'trained' acoustic transfer functions $ATF_{pd,tr}$ determined by an unconstrained method, while the hearing aid system is located on the user's head, both being stored in a database Θ accessible to the hearing device, FIG. 4A schematically shows a first exemplary block diagram of a hearing system comprising a hearing device according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present disclosure relates to a wearable hearing system comprising one or more hearing devices, e.g. headsets or hearing aids. The present disclosure relates in particular to individualization of a multi-channel noise reduction system exploiting and extending a database comprising a dictionary of acoustic transfer functions, e.g. relative acoustic transfer functions (RATF).

The human ability to spatially localize a sound source is to a large extent dependent on perception of the sound at both ears. Due to different physical distances between the sound source and the left and right ears, a difference in time of arrival of a given wavefront of the sound at the left and right ears is experienced (the Interaural Time Difference, ITD). Consequently, a difference in phase of the sound signal (at a given point in time) will likewise be experienced and in particular perceivable at relatively low frequencies (e.g. below 1500 Hz). Due to the shadowing effect of the head (diffraction), a difference in level of the received sound signal at the left and right ears is likewise experienced (the Interaural Level Difference, ILD). The attenuation by the head (and body) is larger at relatively higher frequencies (e.g. above 1500 Hz). The detection of the cues provided by the ITD and ILD largely determine our ability to localize a sound source in a horizontal plane (i.e. perpendicular to a longitudinal direction of a standing person). The diffraction of sound by the head (and body) is described by the Head Related Transfer Functions (HRTF). The HRTF for the left and right ears ideally describe respective transfer functions from a sound source (from a given location) to the ear drums of the left and right ears. If correctly determined, the HRTFs provide the relevant ITD and ILD between the left and right ears for a given direction of sound relative to the user's ears. Such $HRTF_{left}$ and $HRTF_{right}$ are preferably applied to a sound signal received by a left and right hearing assistance device in order to improve a user's sound localization ability (cf. e.g. Chapter 14 of [Dillon; 2001]).

Several methods of generating HRTFs are known. Standard HRTFs from a dummy head can e.g. be provided, as e.g. derived from the KEMAR HRTF database of [Gardner and Martin, 1994] and applied to sound signals received by left and right hearing assistance devices of a specific user. Alternatively, a direct measurement of the user's HRTF, e.g. during a fitting session can—in principle—be performed, and the results thereof be stored in a memory of the respective (left and right) hearing assistance devices. During use, e.g. in case the hearing assistance device is of the Behind The Ear (BTE) type, where the microphone(s) that pick up the sound typically are located near the top of (and often, a little behind) pinna, a direction of impingement of the sound source may be determined by each device, and the respective relative HRTFs applied to the (raw) microphone signal to (re)establish the relevant localization cues in the signal presented to the user, cf. e.g. EP2869599A1.

An essential part of a multi-channel noise reduction systems (such as minimum variance distortionless response (MVDR), Multichannel Wiener Filter (MWF), etc.) in hearing devices is to have access to relative acoustic transfer function RATF for the source of interest. Any mismatch between the true RATF and the RATF employed in the noise reduction system may lead to distortion and/or suppression of the signal of interest.

A first method ('Method 1') to find the RATF that is associated with the source signal of interest is the selection of a RATF from a dictionary of plausible (previously determined) RATFs. This method is referred to as constrained maximum likelihood RATF estimation [1,2]. For all the (previously determined (pd)) RATFs ($RATF_{pd}$) in the database, the likelihood that a source of interest can be associated with a specific RATF is calculated based on the microphone input(s). The RATF (among the multitude of RATFs ($RATF_{pd}$) of the data base) which is associated with the maximum likelihood is then selected as the current acoustic transfer function ($RATF_{pd,cur}$) for the current electric input signal(s).

The advantage of this (first) method is good performance even in acoustic environments of poor target signal quality (e.g. low SNR) because the selected RATF ($RATF_{pd,cur}$) is always a plausible RATF. Another advantage is that prior information may be used for the RATF selection, for example if some target directions are more likely than others (e.g. in dependence of a sensor or detector, e.g. an own voice detector, e.g. in case the user's own voice is the target signal).

The disadvantage is that the dictionary elements need to be known beforehand and are typically measured on a mannequin (e.g. a head and torso model). Even though the RATFs ($RATF_{pd,std}$) measured on the mannequin are plausible, they may differ from the true RATFs due to differences in the acoustics due to difference in the wearer's anatomy, and/or device placement.

The second method ('Method 2') of RATF estimation is unconstrained which means that any RATF may be estimated from the input data. A maximum likelihood estimator is e.g. provided by the covariance whitening method (see e.g. [3,4]). The second, unconstrained RATF estimation method may e.g. comprise an estimator of the noisy input- and noise-only-covariance matrices, where the latter requires a target speech activity detector (to separate noise-only parts from noisy parts). Furthermore, the method may comprise an eigenvalue decomposition of the noise-only covariance matrix which is used to "whiten" the noisy input covariance matrix. The results may finally be used to compute the maximum likelihood estimate of the RATF. Any RATF may be found by this method, under the condition that the target signal is active in the input signals. Unconstrained HRTFs, e.g. RATFs, of a binaural hearing system, e.g. a binaural hearing aid system, for given electric input signals from microphones of the system may e.g. be determined as discussed in EP2869599A1.

The advantage of this (second) method is that an accurate estimate of the RATF can be found at high SNR, more accurately than with the constrained ML method (dictionary method), since it is not constrained to a finite/discrete set of dictionary elements. Further, the unconstrained acoustic transfer functions are personalized, in that they are estimated while the user wears the hearing system.

A disadvantage is that less accurate estimates are obtained in low SNR due to estimation errors, as compared to the constrained method, because the unconstrained method does not employ the prior knowledge that the RATF in question is related to a human head/mannequin—in other words, it could produce estimates which are not physically plausible.

The present disclosure proposes to combine these two methods ('Method 1', 'Method 2') into a hybrid method, in such a way that their advantages are harvested, and their disadvantages avoided.

Consider a RATF estimator that uses a pre-calibrated dictionary (cf. e.g. $\Delta_{pd}$ in FIG. 4C) as described in the previous section. At poor SNR or in a highly reverberant environment, using these dictionary elements ('Method 1') is a good idea since we only allow plausible RATFs and we thereby avoid estimation errors. However, at high SNR we may use 'Method 2' to find the RATF. An advantage of this RATF estimated at high SNR—in addition to the fact that it is not limited to a discrete set—is that it captures personal features of the specific user, which cannot be known during the manufacturing process of the hearing device (and thus not be incorporated in the database from the start).

Under certain conditions (see example below) this more accurate RATF, estimated at high SNRs, can be stored as a new dictionary element which will then be available in 'Method 1' as a plausible RATF. We will refer to these dictionary elements as 'trained' (cf. e.g. $\Delta_{pd}$ and (dashed) arrow $ATF_{uc,cur}$ from controller (CTR3) to the data base (MEM [DB]) in FIG. 4C, and dictionary $\Delta_{pd,tr}$ in FIG. 3).

The dictionary elements that are allowed to be updated can be regarded as additional dictionary elements, i.e. a base of dictionary elements (cf. e.g. $\Delta_{pd,std}$ in FIG. 3) is always kept, while a subset of dictionary elements ($\Delta_{pd,tr}$ in FIG. 3) is allowed to be updated. This may be practical in order to guarantee reasonable performance, even if erroneous dictionary elements are included in the additional dictionary ($\Delta_{pd,tr}$).

The dictionary elements may be updated jointly in both of a left and a right hearing instrument (of a binaural hearing system). A database adapted to the particular location of the left hearing device of a binaural hearing aid system (on the user's head) may be stored in the left hearing device. Likewise, a database adapted to the particular location of the right hearing device of a binaural hearing aid system (on the user's head) may be stored in the right hearing device. A database located in a separate device (e.g. a processing device in communication with the left and right hearing devices) may comprise a set of dictionary elements for the left hearing device and a corresponding set of dictionary elements for the right hearing device.

The RATFs estimated by the unconstrained method (and stored in the additional dictionary ($\Delta_{pd,tr}$)) may (or may not) be assigned to a target location, e.g. depending on the proximity to the existing dictionary elements (which may (typically) be related to a specific target location (cf. e.g. $\theta_j$). The distance may e.g. be determined as or based on the mean-squared error (MSE), or other distance measures allowing a ranking of vectors in order of similarity (proximity).

Instead of (or in addition to) assigning a location to the personalized additional dictionary elements ($ATF_{pd,tr}$) of the sub-dictionary ($\Delta_{pd,tr}$), the processor may be configured to log a frequency of use of these vectors to allow a 'ranking' of their use to be made. Thereby an improved scheme for storing new dictionary elements in the sub-dictionary ($\Delta_{pd,tr}$) can be provided. The lowest ranking elements may e.g. be deleted, when a certain number of elements have been included in the personalized sub-dictionary ($\Delta_{pd,tr}$). Thereby a qualified criterion is provided to limit the number of additional elements in the personalized sub-dictionary ($\Delta_{pd,tr}$).

The previously determined acoustic transfer function vectors ($ATF_{pd}$) of the dictionary ($\Delta_{pd}$) may generally be ranked in dependence of their frequency of use, e.g. in that the processor logs a frequency of use of the vectors. The processor may e.g. be configured to log a frequency of use of the previously determined (standard) dictionary elements ($ATF_{pd,std}$) of the sub-dictionary ($\Delta_{pd,std}$). A comparison of the frequency of use of corresponding dictionary elements of the standard and personalized sub-dictionaries ($\Delta_{pd,std}$, $\Delta_{pd,tr}$) can be provided (e.g. logged). Based thereon conclusions regarding the relevance of the standard and/or personalized elements can be drawn. Elements concluded to be irrelevant may e.g. be deleted (either in an automatic process (e.g. the lowest ranking, e.g. above a certain number of stored elements, or manually, e.g. by the user or by a hearing care professional).

FIG. 1 schematically illustrates a typical geometrical setup of a user wearing a binaural hearing system comprising left and right hearing devices ($HD_L$, $HD_R$), e.g. hearing aids or earpieces of a headset, on his or her head (HEAD) in an environment comprising a (e.g. point) source (S) in a front (left) half plane of the user defined by a distance $d_s$ between the sound source (S) and the centre of the user's head (HEAD). The centre of the user's head may e.g. define a centre of a coordinate system. The user's nose (NOSE) defines a look direction (LOOK-DIR) of the user (or mannequin or other 'test subject'), and respective front and rear directions relative to the user are thereby defined (see arrows denoted Front and Rear in the left part of FIG. 1). The sound source (S) is located at an angle $(-)\theta_s$ to the look direction of the user in a horizontal plane (e.g. through the ears of the user, e.g. when standing). The left and right hearing devices ($HD_L$, $HD_R$) are located—a distance a apart from each other—at left and right ears ($Ear_L$, $Ear_R$), respectively, of the user (or other Test subject). Each of the left and right hearing devices ($HD_L$, $HD_R$) comprises respective front ($M_{1x}$) and rear ($M_{2x}$) microphones (x=L (left), R (right)) for picking up sounds from the environment. The front ($M_{1x}$) and rear ($M_{2x}$) microphones are located on the respective left and right hearing devices a distance $\Delta L_M$ (e.g. 10 mm) apart, and the axes formed by the centres of the two sets of microphones (when the hearing devices are correctly mounted at the user's ears) define respective reference directions ($REF\text{-}DIR_L$, $REF\text{-}DIR_R$) of the left and right hearing devices, respectively, of FIG. 1. The location of the sound source relative to the user (defined by arrow or vector $d_s$ (or angle $\theta_s$ in a horizontal plane) may define a common direction-of-arrival for sound received at the left and right ears of the user. The real direction-of-arrival of sound from sound source S at the left and right hearing devices will in practice be different (e.g. defined by vectors $d_{sL}$, $d_{sR}$) from the one defined by arrow $d_s$ (the difference changing with the distance ($d_s=|d_s|$) and angle ($\theta_s$)). If considered necessary, the correct angles ($\theta_L$, $\theta_R$) may e.g. be determined (e.g. in advance of use of the hearing device or system) from the geometrical setup (including angle $\theta_s$, distance $d_s$ and distance a between the hearing devices).

Figure 2:
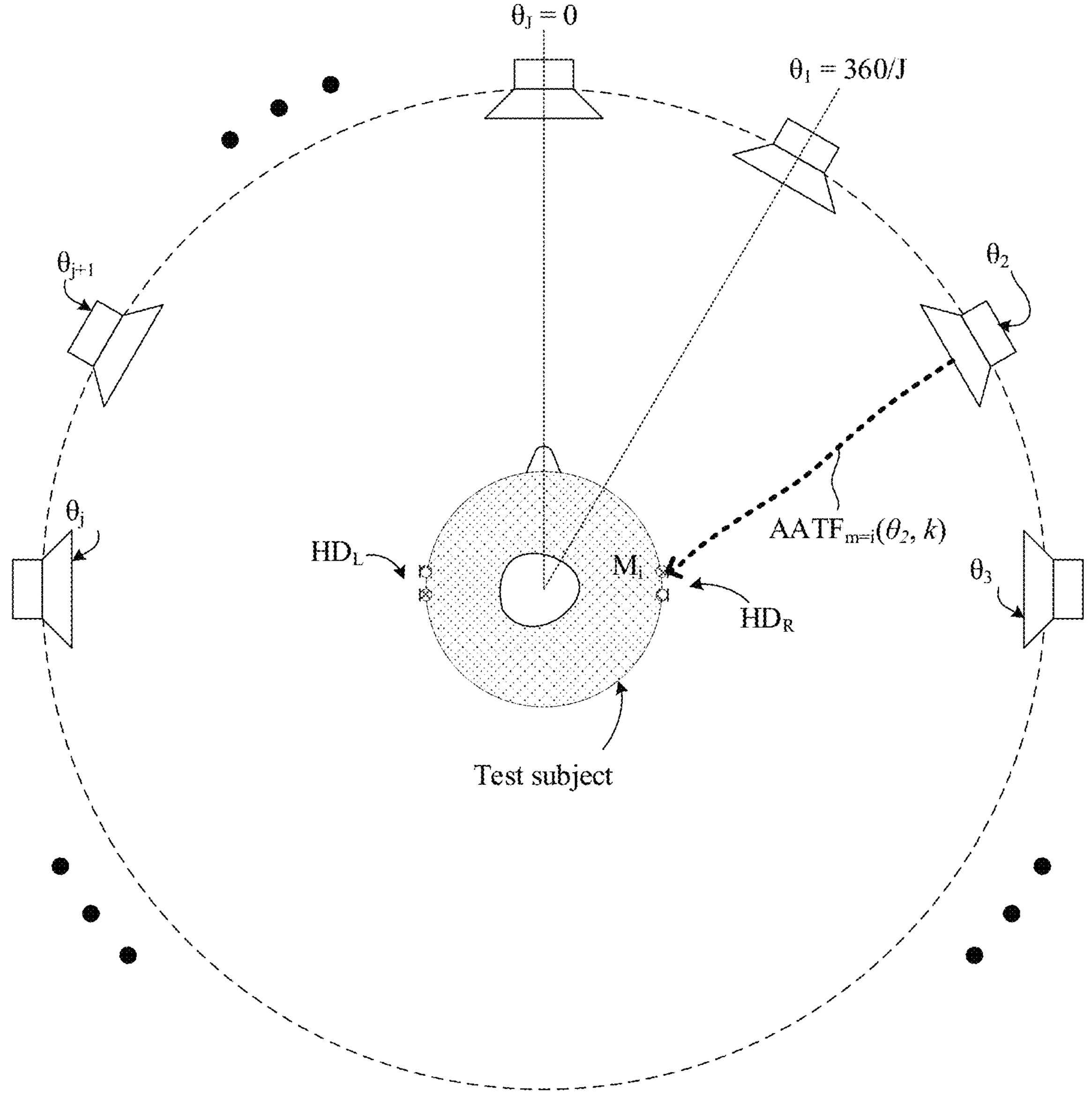

A dictionary $\Delta_{pd}$ of absolute and/or relative transfer functions may be determined as indicated in FIG. 2 and described in the following (cf. 'Method 1' mentioned above).

FIG. 2 shows a head of a person (or other test subject, e.g. a mannequin) wearing a hearing system comprising left and right hearing instruments ($HD_L$, $HD_R$), wherein the left and right hearing instruments are mounted as intended (parallel to a horizontal reference direction $\theta_j=0$ in FIG. 2, cf. also $REF\text{-}DIR_L$ and $REF\text{-}DIR_L$ in FIG. 1). The test sound is (sequentially) positioned at a multitude J of directions (represented by angles $\theta_j$, j=1, . . . , J, to sound sources (cf. loudspeaker symbols), e.g. located on a circle around (i.e. a fixed distance from) the test subject), e.g. in a horizontal plane, e.g. relative to the centre of the persons head. Each angle step is e.g. 360°/J, e.g. 30° for J=12, or 15° for J=24, or 7.5° for J=48. An acoustic transfer function, e.g. an absolute acoustic transfer function $AATF_{m=i}(\theta_2, k)$, is schematically indicated by the dashed arrow from the sound source at $\theta_2$ to microphone $M_i$ (e.g. defined as a reference microphone) of the right hearing aid ($HD_R$) for a given person (or other test object), and a given frequency k. It is assumed that a dictionary $\Delta_{pd}$ of acoustic transfer functions ATF (e.g. absolute (AATF) or relative (RATF) acoustic transfer functions) for a given person (or other test object) comprises values for each microphone (m=1, . . . , M), a multitude of locations of the sound source ($\theta_j$, j=1, . . . , J), and for all frequencies (k=1, . . . , K) of importance, where K is the number of frequency bands (cf. e.g. FIG. 3).

To determine the relative acoustic transfer functions (RATF), e.g. RATF-vectors do, of the dictionary $\Delta_{pd}$, from the corresponding absolute acoustic transfer functions (AATF), $H_\theta$, the element of RATF-vector ($d_\theta$) for the $m^{th}$ microphone and direction ($\theta$) is $d_m(k, \theta)=H_m(\theta, k)/H_i(\theta, k)$, where $H_i(\theta,k)$ is the (absolute) acoustic transfer function from the given location ($\theta$) to a reference microphone (m=i) among the M microphones of the microphone system (e.g. of a hearing instrument, or a binaural hearing system), and $H_m(\theta,k)$ is the (absolute) acoustic transfer function from the given location ($\theta$) to the $m^{th}$ microphone. Such absolute and relative transfer functions (for a given artificial (e.g. a mannequin) or natural person (e.g. the user or (typically) other person)) can be estimated (e.g. in advance of the use of the hearing aid system) and stored in the dictionary $\Delta_{pd}$ as indicated above. The resulting (absolute) acoustic transfer function (AATF) vector $H_\theta$ for sound from a given location ($\theta$) to a hearing instrument or hearing system comprising M microphones may be written as $$H(\theta, k) = [H_1(\theta, k) \ \ldots \ H_M(\theta, k)]^T,$$

$$k = 1, \ldots, K.$$

The corresponding relative acoustic transfer function (RATF) vector $d_\theta$ from this location may be written as $$d(\theta, k) = [d_1(\theta, k) \ \ldots \ d_M(\theta, k)]^T,$$
$$k = 1, \ldots , K,$$

where, $d_i(k,\theta)=1$.

Target Estimation in Hearing Aids:

Classical hearing aid beamformers assume that the target of interest is in front of the hearing aid user. Beamformer systems may perform better in terms of target loss and thereby provide an SNR improvement for the user if they have access to accurate estimates of the target location.

The proposed method may use predetermined (standard) dictionary (vector) elements ($ATF_{pd,std}$) measured on a mannequin (e.g. the Head and Torso Simulator (HATS) 4128C from Bruel & Kjær Sound & Vibration Measurement A/S, or the head and torso model KEMAR from GRAS Sound and Vibration A/S, or similar) as a baseline (e.g. stored in dictionary $\Delta_{pd,std}$ of the database $\Theta$). The proposed method may further estimate more accurate (unconstrained) dictionary (vector) elements ($ATF_{uc,cur}$) (e.g. RATFs) in good SNR (as estimated by an SNR estimator) and store them as dictionary elements ($ATF_{pd,tr}$) given certain conditions (e.g. in a dictionary $\Delta_{pd,tr}$ of the database $\Theta$).

An advantage is that this method can accommodate for individual acoustic properties as well as replacement effects, in both good and less good input SNR scenarios.

Example of usage in hearing aid application: A base dictionary ($\Delta_{pd,std}$) may be given by 48 plausible RATF vectors ($RATF_{pd,std}$) describing relative transfer functions of hearing aid microphones, measured on a HATS in the horizontal plane with 7.5 degrees interval (cf. e.g. FIG. 2), if the angle distance is uniform. Other values than 7.5° may be used. Further, the angles may be non-uniformly distributed, e.g. in that smaller angles are used in regions that are expected to be most frequently experienced by the user, e.g. front (or a particular side, or the back). A set of 16 corresponding trained dictionary elements ($RATF_{pd,tr}$) may e.g. be available from a personalized dictionary ($\Delta_{pd,tr}$). These dictionary elements may be updated (and possibly increased in number) when the input SNR exceeds a certain threshold. The rationale (criterion) for updating (storing) a specific trained dictionary element ($RATF_{uc,cur}$) can simply be that the corresponding base dictionary element ($RATF_{pd,cur}=RATF_{pd,std}(\theta_{j'})$) has maximum likelihood. In that case the trained dictionary element ($RATF_{pd,tr}(\theta_{j'})=RATF_{uc,cur}$) may represent a more accurate version of the base dictionary element, which is optimized for the user, and to the usage of the hearing device (e.g. device placement at the user's ear). Other criteria may be used.

Own Voice Enhancement in Headsets (or Hearing Aids):

Beamforming is used in headsets to enhance the user's own voice in communication scenarios=hence, in this situation, the user's own voice is the signal of interest to be retrieved by a beamforming system. Microphones can be mounted at different locations in the headset. For example, multiple microphones may be mounted on a boom-arm pointing at the user's mouth, and/or multiple microphones may be mounted inside and outside of small in-ear headsets (or earpieces).

The RATFs which are needed for own voice capture may be affected by acoustic variations, such as: Individual user acoustic properties (as opposed to HATS in a calibration situation), microphone location variations due to boom arm placement, and human head movements (for example jaw movements affecting microphones placed in the ear canal).

A baseline dictionary may contain RATFs measured on a HATS in a standard boom arm placement and in a set of representative boom arm placements. The extended dictionary elements can then accommodate (for an individual user) variations and replacement variations related to the actual wearing situation, for example if the boom arm is outside the expected range of variations.

In a hearing aid, estimation of the user's own voice may also be of interest in a communication mode of operation, e.g. for transmission to a far-end communication partner (when using the hearing aid in a headset- or telephone-mode). Also, estimation of the user's own voice may be of interest in a hearing aid in connection with a voice control interface, where the user's own voice may be analysed in a keyword detector or by a speech recognition algorithm.

Hybrid Method Operation:

The RATF estimator may operate in different ways:

1. Switch between dictionary (constrained) method ('Method 1') and unconstrained method ('Method 2'). Thereby we allow any RATF under certain pre-defined conditions (decision rationale).
2. Always use dictionary method ('Method 1'). Thereby we ensure that only dictionary elements are used, either pre-calibrated or trained Rationale for Updating a Trained Dictionary Element:

In order to update a trainable dictionary element, the method needs a rationale. A straightforward rationale is when the target signal is available in good quality, e.g. when the (target) signal-to-noise-ratio (SNR) is sufficiently high, e.g. larger than a threshold value ($SNR_{TH}$). A, preferably reliable/robust, target signal quality estimator, e.g. an SNR estimator may provide this. The Power Spectral Density (PSD) estimators provided by the maximum likelihood (ML) methods of e.g. [2] and [5] may e.g. be used to determine the SNR. US20190378531A1 teaches SNR-estimation.

Figure 4A:
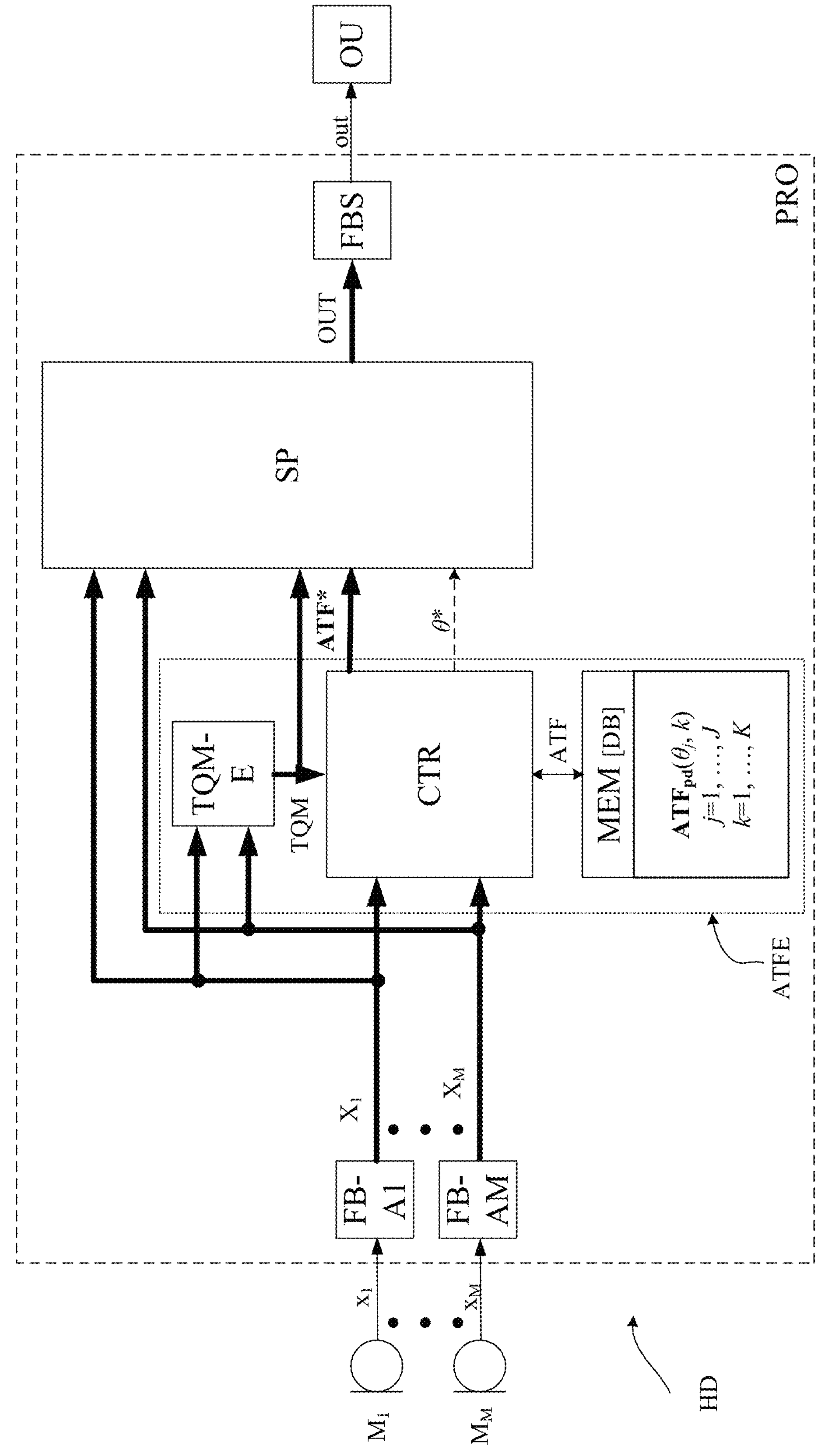
FIG. 4B schematically shows a second exemplary block diagram of a hearing system comprising a hearing device according to the present disclosure.
FIG. 4C schematically shows a third exemplary block diagram of a hearing system comprising a hearing device according to the present disclosure.
Figure 4B:
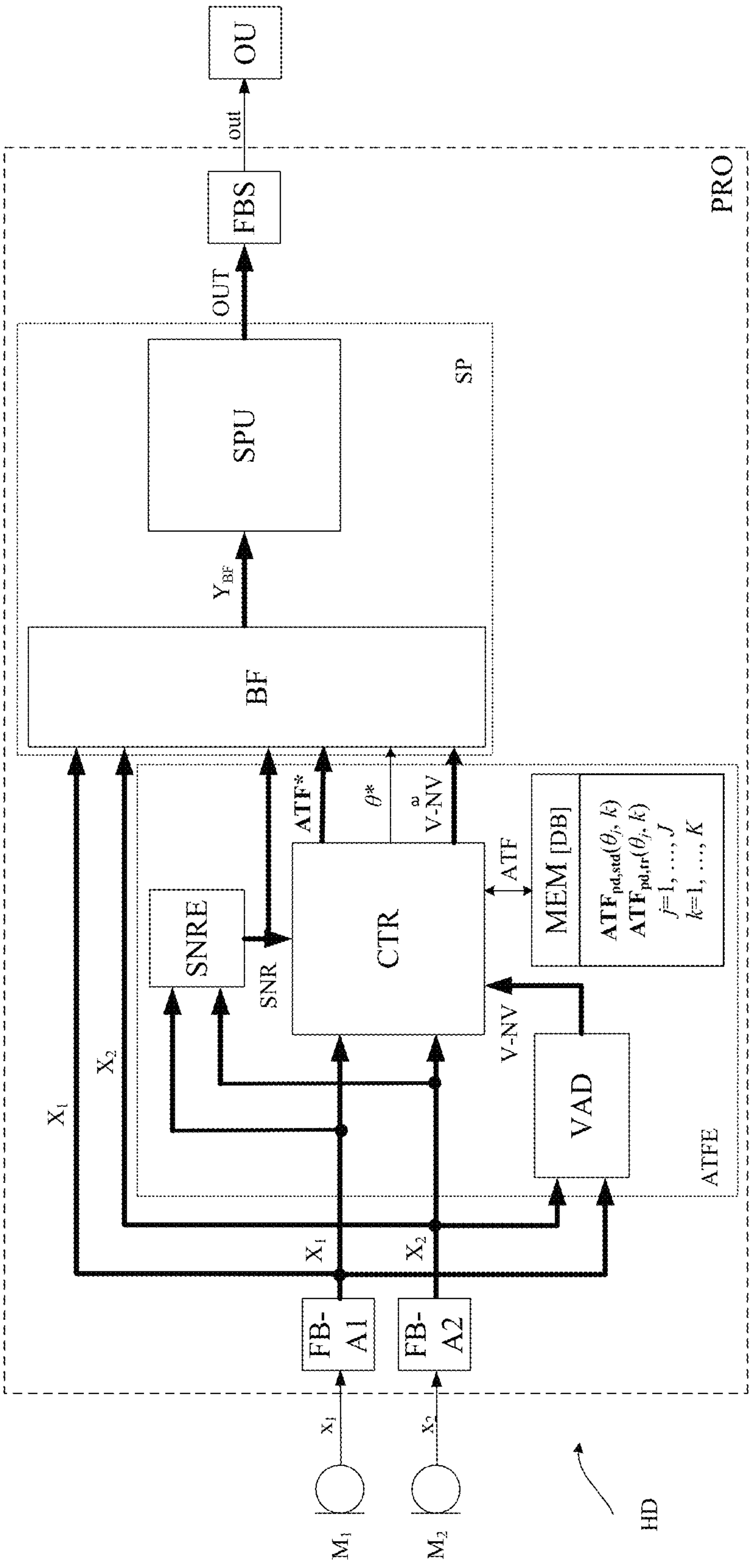
Figure 4C:
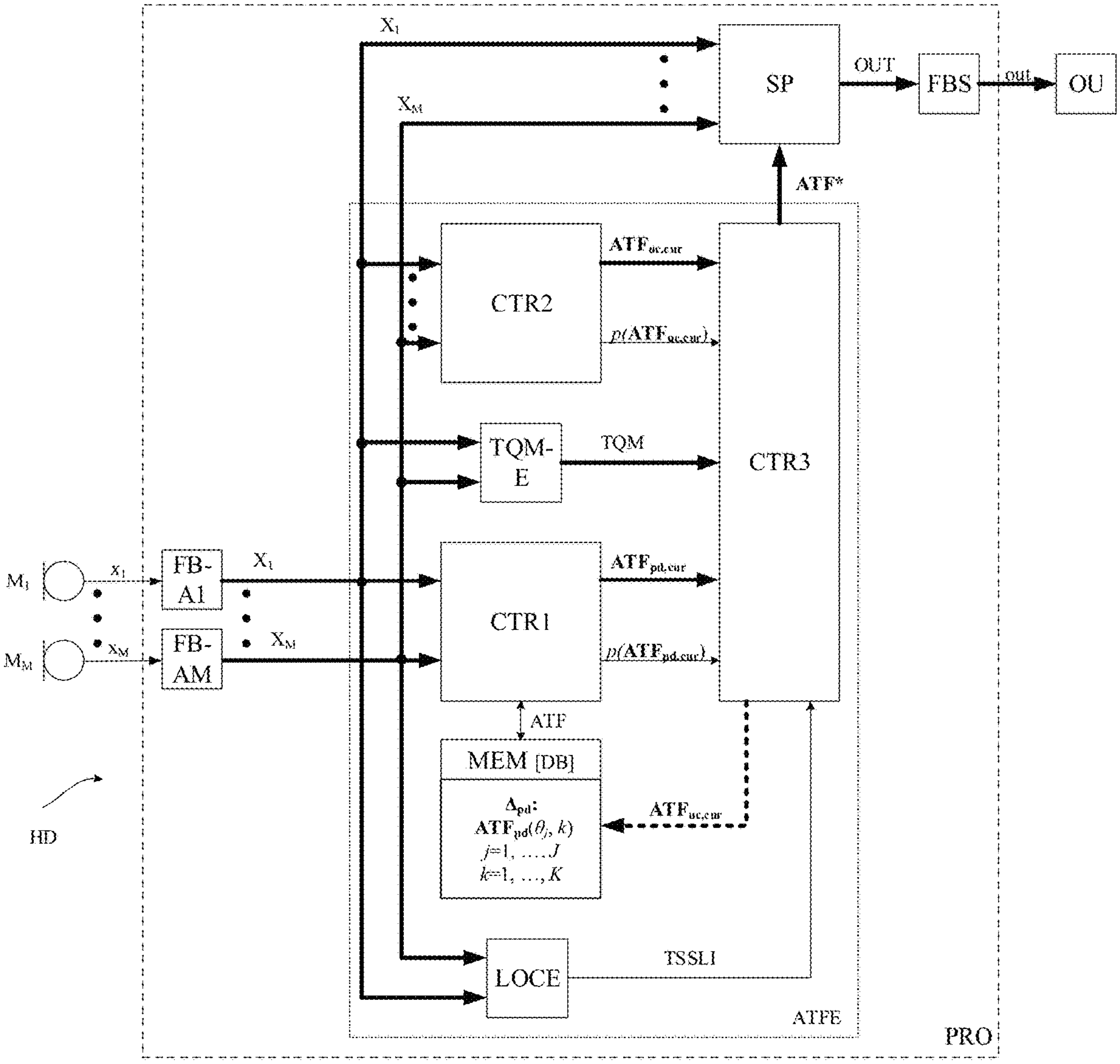

Furthermore, the rationale may include the likelihood (cf. e.g. $p(ATF_{uc,cur})$ in FIG. 4C), for the current unconstrained RATF estimate ($ATF_{uc,cur}$), e.g. compared with the maximum likelihood (cf. e.g. $p(ATF_{pd,cur})$ in FIG. 4C), for the pre-calibrated dictionary elements ($ATF_{pd,cur}$).

The rationale may also be related to other detection algorithms, e.g., voice activity detection (VAD) algorithms, see [4] for an example (no update unless clear voice activity is detected), sound pressure level estimators (no update unless sound pressure level is within reasonable range for noise-free speech, e.g., between 55 and 70 dB SPL, cf. e.g. signal voice activity control signal (V-NV) from voice activity detector (VAD) to the controller (CTR) in FIG. 4B). Signals from other detectors may also be included in the rationale, e.g. accelerometers (no update unless head has stayed still for a certain duration), a reverberation detector, etc.

A criterion for determining whether or not an estimated HRTF is plausible may be established (e.g. does it correspond to a likely direction; is within a reasonable range of values, etc.), e.g. relying on an own voice detector (OVD), or a proximity detector, or a direction-of-arrival (DOA) detector. Hereby an estimated HRTF may be dis-qualified, if it is not likely (and hence not used or not stored).

Binaural Devices:

With one device on each ear, for example hearing aids and in-ear headsets, we may exploit a binaural decision rationale for updating a trainable dictionary element.

The update criterion may be a binaural criterion, also taking into account that e.g. an otherwise plausible 45 degree HRTF is not plausible if the contralateral HRTF-angle does not correspond to a similar direction. Such differences may indicate that the hearing instruments are not correctly mounted (see also section on 'user feedback' below).

Comparing estimated left and right angles may e.g. reveal if the angle related to the dictionary elements agree on both sides. It could be that the angles are systematically shifted by a few degrees when comparing the left and right angles. This may indicate that the mounted instruments are not pointing towards the same direction. This bias may be taken into account when assigning the dictionary elements.

User Feedback on Device Usage:

If there is a large difference between trained elements (cf. e.g. $ATF_{pd,tr}$ in FIG. 3) compared to pre-calibrated dictionary elements (cf. e.g. $ATF_{pd,std}$ in FIG. 3), the user can be informed about it, e.g. via a user interface, e.g. in a separate device, e.g. a smartphone or other portable electronic device with a display or the like. In this case, there could be a problem related to the use, wearing and/or "goodness of fit" of the hearing device or of the pre-calibrated dictionary elements.

It may also imply problems with microphones, for example in the case of dust or dirt in the microphone inlets.

Also, in the case of unexpected deviations in the binaural case, the user can be informed about possible problems with the device.

Relation to "Head Dictionaries":

In our co-pending European patent application number EP20210249.7 filed with European patent office on 27 Nov. 2020 and having the title "A hearing aid system comprising a database of acoustic transfer functions", it is proposed to include dictionaries of head related transfer functions for different heads (e.g. different users, sizes, forms, etc., cf. e.g. FIG. 2A, 2B therein). In this context, the trained dictionary of the present disclosure may be a plausible new 'head dictionary' (or may be close in values to those of an existing head dictionary). An anomaly in the trained RATFs may be found by comparing with existing plausible head dictionary elements (e.g. for different ('types' of) heads).

Figure 3:
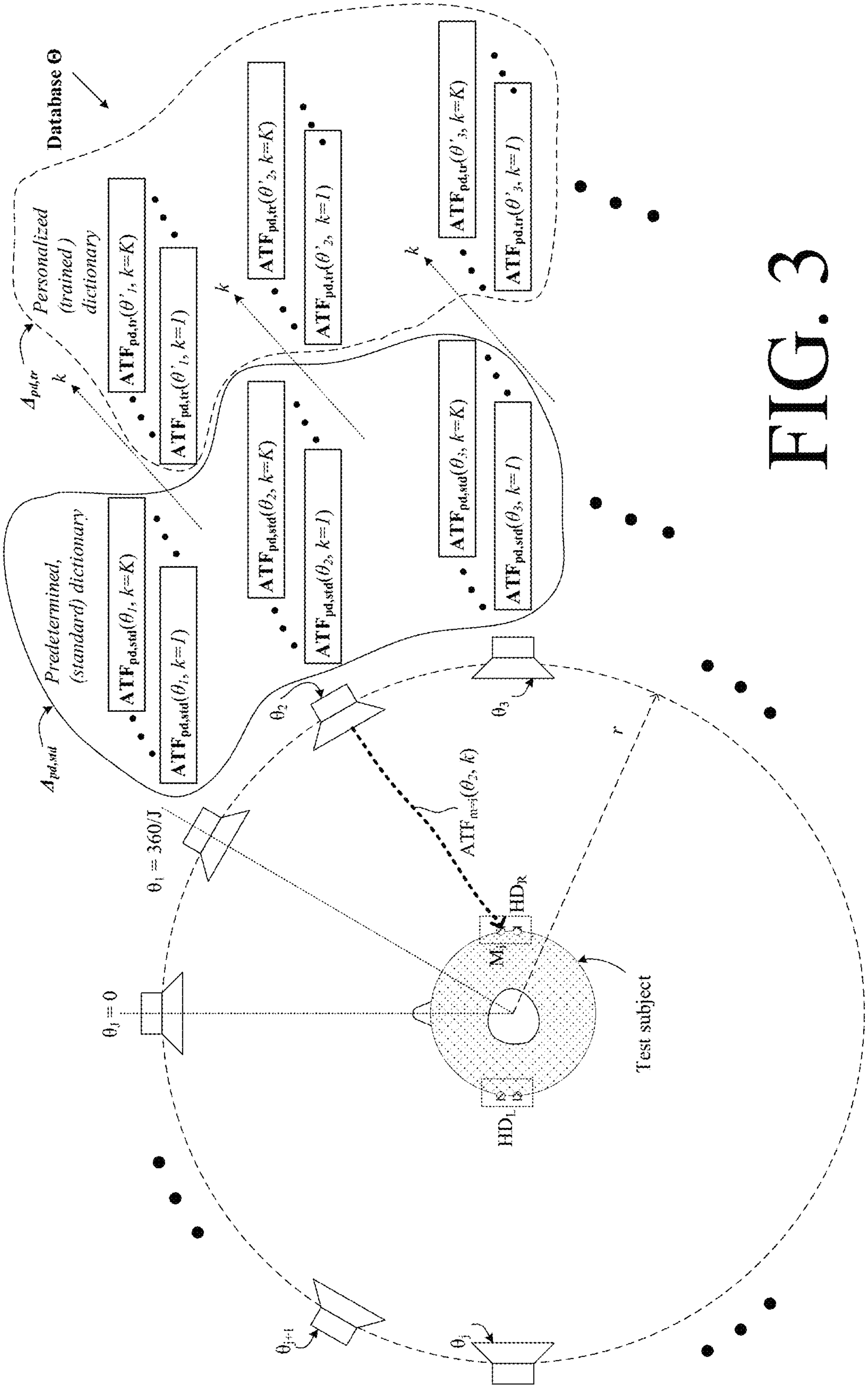

FIG. 3 schematically illustrates for a given test object (e.g. a natural or artificial person), a database comprising previously defined (e.g. measured) acoustic transfer functions $ATF_{pd,std}$ for different locations ($\theta_j$, j=1, . . . , J) of the sound source, and for each location of the microphones (index m, m=1, . . . , M) of a hearing instrument (e.g. the right hearing aid ($HD_R$)) or hearing system (e.g. for a binaural hearing system comprising left and right hearing aids ($HD_L$, $HD_R$)) and for each frequency index (k, k=1, . . . , K). FIG. 3 further illustrates corresponding (previously determined) 'trained' acoustic transfer functions $ATF_{pd,tr}$ determined by an unconstrained method, e.g. estimated from the input data experienced by the user (including the microphone signals, e.g. by a maximum likelihood estimator, but not relying on the database), while the user wears the hearing aid or hearing system. $ATF_{pd,std}$ and $ATF_{pd,tr}$ in FIG. 3 refer to respective vectors comprising elements $ATF_{pd,std,m}$, and $ATF_{pd,tr,m}$, m=1, . . . , M of the previously determined standard transfer functions and the previously determined trained (=personalized) acoustic transfer functions (assembled in respective dictionaries ($\Delta_{pd,std}$ and $\Delta_{pd,tr}$)). The geometrical measurement setup for different locations is as in FIG. 2.

It is intended that the measurements are performed individually on microphones of the right hearing aid ($HD_R$) and the left hearing aid ($HD_R$). The results of the measurements may be stored in respective left and right hearing aids (e.g. databases $\Theta_L$ and $\Theta_R$) or in a common database $\Theta_C$ stored in one of or in each of the left and right hearing aids, or in another device or system in communication with the left and/or right hearing aids, e.g. a separate processing device.

The exemplary contents of the database $\Theta$ are illustrated in the upper right part of FIG. 3. For each location of ($\theta_j$) the sound source relative to a given microphone ($M_m$), a number of predetermined (e.g. measured) acoustic transfer functions $ATF_{pd,std}$ are indicated (one for each frequency band k). Likewise, for each location of ($\theta'_j$) the sound source relative to a given microphone ($M_m$), a number of previously determined (trained) acoustic transfer functions $ATF_{pd,tr}$ are indicated (one for each frequency band k). The trained acoustic transfer functions $ATF_{pd}$,tr are estimated by an unconstrained method. The location of the sound source is provided with a hyphen (') on the angle symbol ($\theta'_j$) to indicate that the location of the sound source (here 'angle') for the estimated acoustic transfer function may be freely estimated or assumed equal to a corresponding one of the angles of the predetermined, standard acoustic transfer functions $ATF_{pd,std}$, e.g. determined according to a predefined criterion (e.g. involving a cost function, e.g. based on a maximum likelihood criterion, e.g. the one being the closest according to selected distance measure, e.g. MSE).

The location of the sound source (S, or loudspeaker symbol in FIG. 1, 2, 3) relative to the hearing aid (microphone system or microphone) is symbolically indicated by symbol $\theta$ and shown in FIGS. 2 and 3 as an angle ($\theta_j$, j=1, . . . , J) in a horizontal plane a certain radial distance from the centre of the test subject (cf. dashed circle around the test subject, and dashed arrow indicating a radius, r, in FIG. 3). The horizontal plane may e.g. be a horizontal plane through the ears of the person or user (when the person or user is in an upright position). The location $\theta$ may however also indicate a location out of a horizontal plane (e.g. defined by coordinates (x, y, z) or ($\theta$, $\varphi$, z), etc. The acoustic transfer functions ATF stored in the database(s) may be or represent absolute acoustic transfer functions AATF or relative acoustic transfer functions RATF.

Exemplary Embodiments of a Hearing Device:

FIG. 4A shows an exemplary block diagram of a hearing device, e.g. hearing aid, (HD) according to the present disclosure. The hearing device (HD) may e.g. be configured to be worn on the head at or in an ear of a user (or be partly implanted in the head at an ear of the user). The hearing device comprises a microphone system comprising a multitude of M of microphones $M_1$, . . . , $M_M$), e.g. arranged in a predefined geometric configuration, in the housing of the hearing aid. The microphone system is adapted to pick up sound from the environment and to provide corresponding electric (time-domain) input signals $x_m(n)$, m=1, . . . , M, where n represents time. The environment sound at a given microphone may comprise a mixture (in various amounts) of a) a target sound signal propagated via an acoustic propagation channel from a (possibly localized) target sound source to the $m^{th}$ microphone of the hearing device when worn by the user, and b) additive noise signals as present at the location of the $m^{th}$ microphone. The acoustic propagation channel is modeled as $x_m(n)=s_m(n)h_m(\theta)+v_m(n)$, wherein $x_m(n)$ represents the noisy input signal at microphone m, $s_m(n)$ represents the target sound signal as provided by the target sound source, $h_m(\theta)$ is an acoustic impulse response for sound for the acoustic propagation channel from sound source to microphone m, and $v_m(n)$ represents additive noise at the $m^{th}$ microphone. The hearing device comprises a controller (CTR) connected to the microphones ($M_1, \ldots, M_M$) receiving electric signals ($X_1, \ldots, X_M$) representative of the electric input signals ($x_1, \ldots, x_M$). The electric signals ($X_1, \ldots, X_M$) are here provided in a time frequency representation (k, l) as frequency sub-band signals by respective analysis filter banks (FB-A1, . . . , FB-AM), e.g. as a Fourier transform of time domain electric input signals ($x_1, \ldots, x_M$). The hearing device (HD) further comprises a target signal quality estimator (TQM-E) configured to provide a measure of a current signal quality (TQM) of at least one of the current electric input signals (($x_1, \ldots, x_M$) or ($X_1, \ldots, X_M$)) or of a signal (e.g. a beamformed signal, ($Y_{BF}$)) or signals originating therefrom. The target signal quality measure (TQM) is fed to the controller (CTR) for possible use in the estimation of a current acoustic transfer function (ATF*). The target signal quality measure (TQM) may further be fed to other parts of the hearing device, e.g. to a beamformer (cf. FIG. 4B) and/or to a gain controller, e.g. in signal processing unit (SP)).

The hearing device (HD) further comprises a database Θ stored in memory (MEM [DB]). The database Θ comprises a dictionary $\Delta_{pd}$ of stored acoustic transfer function vectors ($ATF_{pd}$), whose elements $ATF_{pd,m}$, m=1, . . . , M, are frequency dependent acoustic transfer functions representing location-dependent (θ) and frequency dependent (k) propagation of sound from a location ($\theta_j$) of a target sound source to each of said M microphones, k being a frequency index, k=1, . . . , K, where K is a number of frequency bands. The stored acoustic transfer function vectors ($ATF_{pd}(\theta, k)$) may e.g. be determined in advance of use of the hearing device, while the microphone system ($M_1, \ldots, M_M$) is mounted on a head at or in an ear of a natural or artificial person (preferably as it is when the hearing system/device is operationally worn for normal use by the user), e.g. gathered in a standard dictionary ($\Delta_{pd,std}$). The (or some of the) stored acoustic transfer function vectors ($ATF_{pd}$) may e.g. be updated during use of the hearing device (where the user wears the microphone system ($M_1, \ldots, M_M$)), or a further dictionary ($\Delta_{pd,tr}$) comprising said updated or 'trained' acoustic transfer function vectors (determined by the unconstrained method, and evaluated to be reliable (e.g. by fulfilling a target signal quality criterion)) may be generated during use of the hearing system. The dictionary $\Delta_{pd}$ comprises standard acoustic transfer function vectors ($ATF_{pd,std}$) for the natural or artificial person (e.g. grouped in dictionary $\Delta_{pd,std}$) and, optionally, trained acoustic transfer function vectors ($ATF_{pd,tr}$) (e.g. grouped in dictionary $\Delta_{pd,tr}$), for a multitude (J') of different locations $\theta'_j$, j=1, . . . , J', relative to the microphone system (see FIG. 3). J' may be equal to or different from J.

The hearing device (HD), e.g. the controller (CTR), is configured to determine a constrained estimate of a current acoustic transfer function vector ($ATF_{pd,cur}$) in dependence of said M electric input signals and said dictionary $\Delta_{pd}$ of stored acoustic transfer function vectors ($ATF_{pd,std}$, and optionally $ATF_{pd,tr}$, cf. FIG. 4B). The controller (CTR) is configured to provide the current constrained estimate using the database (MEM [DB]), cf. signal ATF. The current constrained estimate ($ATF_{pd,cur}$) may e.g. be provided using a maximum likelihood framework, wherein a likelihood function is evaluated for each acoustic transfer function (or the relevant acoustic transfer functions) of the dictionary $\Delta_{pd}$ of previously determined acoustic transfer functions given the current electric input signals. The current acoustic transfer function vector ($ATF_{pd,cur}$) may be selected as the on having the largest likelihood. A corresponding location ($\theta_{pd,cur}$) may be associated therewith. The hearing device (HD) is further configured to determine an unconstrained estimate of a current acoustic transfer function vector ($ATF_{uc,cur}$) in dependence of said M electric input signals (without relying on the dictionary $\Delta_{pd}$). The unconstrained estimate may e.g. be provided by a covariance whitening method (see e.g. [3,4]). The hearing device (HD) is further configured to determine a resulting acoustic transfer function vector (ATF*) for the user in dependence of a) the constrained estimate of a current acoustic transfer function vector ($ATF_{pd,cur}$), b) the unconstrained estimate of a current acoustic transfer function vector ($ATF_{uc,cur}$), and c) the target signal quality measure (TQM).

The database Θ is in the embodiment of FIGS. 4A (and 4B, 4C) stored in memory (MEM [DB]) of the hearing device (connected to the controller (CTR) via signal ATF). The hearing device may then e.g. constitute the hearing system. In other embodiments, the database may be accessible from the hearing device (HD) but physically located in another system or device (e.g. in an auxiliary device, e.g. an external processing device), e.g. accessible via a wireless link.

In the embodiment of FIGS. 4A (and 4B, 4C), the (current) resulting ATF-vector ATF* (e.g. representing absolute or relative acoustic transfer functions ($H^*_\theta$ or $d^*_\theta$) and the specific estimated location $\theta_j=\theta^*$ of the sound source associated with the (current) resulting ATF-vector ATF* is fed to signal processing unit (SP), e.g. together with a parameter (TQM) indicating a quality of the target signal (e.g. a signal to noise ratio (SNR), cf. FIG. 4B, or an estimated noise level, or a signal level, etc.) of one or more of the electric input signals that were used to determine the (current) ATF-vector ATF*.

FIG. 4B schematically shows a second exemplary block diagram of a hearing device according to the present disclosure. The embodiment of FIG. 4B resembles the embodiment of FIG. 4A but exhibits the differences outlined in the following.

The embodiment of FIG. 4B comprises two microphones ($M_1, M_2$) providing respective two electric input signals ($x_1, x_2$) that are converted to time-frequency domain signals ($X_1, X_2$) by respective analysis filter banks (FB-A1, FB-A2).

In the embodiment of FIG. 4B, the target signal quality estimator is embodied in SNR-estimator (SNRE). The SNR-estimator (SNRE) is configured to estimate a current signal-to-noise-ratio (SNR) (or an equivalent estimate of a quality) of at least one of the current electric input signals (($x_1, x_2$) or ($X_1, X_2$)) or of a signal (e.g. a beamformed signal, ($Y_{BF}$)) or signals originating therefrom. Here, the SNR estimator receives time-frequency domain signals ($X_1, X_2$) from the respective analysis filter banks (FB-A1, FB-A2). The SNR estimate (SNR) is fed to the controller (CTR) for possible use in the estimation of a current acoustic transfer function (ATF*). The SNR estimate (SNR) is further be fed to other parts of the hearing device, here to beamformer (BF).

In the embodiment of FIG. 4B, the database Θ stored in memory (MEM [DB]) comprises (predetermined, frequency dependent) acoustic transfer function vectors ($ATF_{pd,std}(\theta, k)$) for different locations (θ) (as in FIG. 4A) as well as updated or 'trained' acoustic transfer function vectors ($ATF_{pd,tr}$) determined by the unconstrained method, and evaluated to be reliable (e.g. by fulfilling a target signal quality criterion, or other criterion providing a certain level of confidence). These elements may be used to determine the constrained estimate of the current acoustic transfer function vector ($ATF_{pd,cur}$).

The embodiment of FIG. 4B further comprises a voice activity detector (VAD) for estimating a presence or absence of human voice (e.g. speech) in (at least one of) the electric input signals. One or more (here all) of the time-frequency domain signals ($X_1$, $X_2$) are fed to the voice activity detector (VAD). The voice activity detector (VAD) provides a voice activity control signal (V-NV) indicative of whether or not (or with what probability) an input signal comprises a voice signal (e.g. speech, at a given point in time, and in a given frequency band). The voice activity control signal (V-NV) is fed to the controller (CTR) for possible use in the estimation of a current acoustic transfer function (ATF) as well as to the beamformer (BF).

The embodiment of FIG. 4B further comprises a beamformer (BF) configured to provide a beamformed signal ($Y_{BF}$) in dependence of the current electric input signals (here the time-frequency domain signals ($X_1$, $X_2$)) and predefined or adaptively updated beamformer weights ($w_{ij}$). Adaptively updated beamformer weights ($w_{ij}$) may e.g. be determined in dependence of said resulting (current) ATF-vector ATF*, e.g. in the form of a relative ATF, RATF*, (often termed d(θ*,k)) and the current voice activity control signal (V-NV) and possibly the estimate of the current signal-to-noise-ratio (SNR). This is e.g discussed for a minimum variance distortionless response (MVDR) beamformer in EP3236672A1.

The embodiment of FIG. 4B further comprises a signal processing unit (SPU) for applying further processing algorithms to the beamformed signal ($Y_{BF}$). Such further processing algorithms may e.g. include one or more of a single channel noise reduction algorithm (e.g. embodied in a postfilter), a level compression algorithm (e.g. for compensating for a user's hearing impairment), a frequency transposition algorithm (e.g. for moving (and possibly compressing) content from one frequency range to another (where the user's hearing ability is better), etc. The signal processing unit (SPU) provides a processed signal (OUT) in dependence of the beamformed signal ($Y_{BF}$) and the applied processing algorithms.

The controller (CTR) is connected to the database (MEM [DB]), cf. signal ATF, and configured to determine the constrained estimate of a current acoustic transfer function vector ($ATF_{pd,cur}$) in dependence of the M electric input signals and the dictionary $\Delta_{pd}$ of stored acoustic transfer function vectors ($ATF_{pd}$, and optionally $ATF_{pd,tr}$, cf. FIG. 4B). The constrained estimate of a current acoustic transfer function vector ($ATF_{pd,cur}$) may be determined by a number of different methods available in the art, e.g. maximum likelihood estimate (MLE) methods, cf. e.g. EP3413589A1. Other statistical methods may e.g. include Mean Squared Error (MSE), regression analysis (e.g. Least Squares (LS)), e.g. probabilistic methods (e.g. MLE), e.g. supervised learning (e.g. neural network algorithms). The constrained estimate of a current acoustic transfer function vector ($ATF_{pd,cur}$) may e.g. be determined by minimizing a cost function. The controller (CTR) may be configured—at a given time with given electric input signals—to determine a current acoustic transfer function vector ($ATF_{pd,cur}$) as an ATF-vector ($ATF_{pd,cur}$) ($ATF_{pd,cur}$,m(θ*,k), m=1, . . . , M, k=1, . . . , K), i.e. an acoustic transfer function (relative or absolute) for each microphone, for each frequency (k). The constrained estimate of a current acoustic transfer function vector ($ATF_{pd,cur}$) is determined from the dictionary $\Delta_{pd}$ (and optionally $ATF_{pd,tr}$) and the chosen vector is associated with a specific location $\theta_j$=θ* of the sound source, and may thus provide information about an estimated location θ* of the target sound source.

In the embodiments of FIGS. 4A, 4B and 4C, the target signal quality estimator (TQM-E) for providing the measure of a current signal quality (TQM) of at least one of the current electric input signals (($x_1$, . . . , $x_M$) or ($X_1$, . . . , $X_M$)) or of a signal (e.g. a beamformed signal ($Y_{BF}$)), or signals originating therefrom, the memory comprising the database (MEM [DB]) of previously determined acoustic transfer functions, and the controller (CTR) are included in acoustic transfer function estimator (ATFE) for providing the current acoustic transfer function ($ATF^*_j$) in dependence of the current electric input signals (and possible sensors or detectors). The acoustic transfer function estimator (ATFE) is indicated in FIGS. 4A, 4B and 4C by the dotted, rectangular enclosure.

FIG. 4C schematically shows a wearable hearing system, comprising at least one hearing device (HD) configured to be worn on the head at or in an ear of a user. The hearing system, e.g. the hearing device (such as a hearing aid or a headset), comprises a microphone system comprising a multitude of M of microphones ($M_m$, m=1, . . . , M) where M is larger than or equal to two. The microphone system is adapted for picking up sound from the environment of the user and to provide M corresponding (time-domain) electric input signals $x_m(n)$, m=1, . . . , M, n representing time. The environment sound at an $m^{th}$ microphone may comprise a target sound signal propagated from a target sound source around the user to the $m^{th}$ microphone of the hearing system (when the hearing system is worn by the user). The hearing system further comprises a processor (PRO) connected to the multitude of microphones (cf. dashed enclosure in FIGS. 4C (and 4A, 4B)). The processor (PRO) is configured to process the M electric input signals ($x_1$, . . . , $x_M$) and to provide a processed signal (OUT; out) in dependence thereof. The hearing system further comprises an output unit (OU) for providing an output signal in dependence of the processed signal (OUT; out). The hearing system (e.g. the processor) further comprises (or has access to) a database (Θ, denoted MEM [DB] in FIGS. 4C, and 4A, 4B) comprising a dictionary ($\Delta_{pd}$) of previously determined acoustic transfer function vectors ($ATF_{pd}$), whose elements $ATF_{pd,m}$, m=1, . . . , M, are frequency dependent acoustic transfer functions representing location-dependent (θ), and frequency dependent (k) propagation of sound from a location ($\theta_j$) of a target sound source to each of the M microphones, k being a frequency index, k=1, . . . , K, where K is a number of frequency bands. The acoustic transfer function vectors ($ATF_{pd}$) are assumed to have been previously determined (i.e. prior to the use of the hearing system, or previously during use of the hearing system when worn by the user), when said microphone system is mounted on a head at or in an ear of a natural or artificial person. The dictionary $\Delta_{pd}$ comprises acoustic transfer function vectors for the natural or for the artificial person or persons (and possibly personalized acoustic transfer function vectors for the user) for a multitude (J) of different locations $\theta_j$, j=1, . . . , J, of the target sound source relative to the microphone system.

The hearing system, e.g. the processor (PRO), may comprise a multitude of M of analysis filter banks (FBAm, m=1, . . . , M) for converting the time domain electric input signals ($x_1$, . . . , $x_M$) to electric signals ($X_1$, . . . , $X_M$) in a time frequency representation (k, l).

The hearing system, e.g. the processor (PRO), comprises a controller (CTR1) configured to determine a constrained estimate of a current acoustic transfer function vector ($ATF_{pd,cur}$) in dependence of the M electric input signals ($X_1$, . . . , $X_M$) and the dictionary ($\Delta_{pd}$) of previously determined acoustic transfer function vectors ($ATF_{pd}$) stored in the database (Θ, MEM [DB]) via signal ATF. The database may form part of the at least one hearing device (HD), e.g. of the processor (PRO), or be accessible to the processor, e.g. via wireless link. The controller (CTR1) is further configured to provide an estimate of the reliability ($p(ATF_{pd,cur})$) of the constrained estimate of the current acoustic transfer function vector ($ATF_{pd,cur}$).The reliability may e.g. be provided in the form of an acoustic-transfer-function-vector-matching-measure indicative of a degree of matching of the constrained estimate of the current acoustic transfer function vector ($ATF_{pd,cur}$) considering the current electric input signals. The reliability may e.g. be related to how well the constrained estimate of the current acoustic transfer function vector ($ATF_{pd,cur}$) matches the current electric input signals in a maximum likelihood sense (see e.g. EP3413589A1).

The hearing system, e.g. the processor (PRO), comprises a controller (CTR2) configured to determine an unconstrained estimate of a current acoustic transfer function vector ($ATF_{uc,cur}$) in dependence of the M electric input signals ($X_1, \ldots, X_M$). The controller (CTR2) is further configured to provide an estimate of the reliability ($p(ATF_{uc,cur})$), e.g. in the form of a probability) of the unconstrained estimate of the current acoustic transfer function vector ($ATF_{uc,cur}$). The reliability may e.g. be provided in the form of an acoustic-transfer-function-vector-matching-measure indicative of a degree of matching of the unconstrained estimate of the current acoustic transfer function vector ($ATF_{uc,cur}$) considering the current electric input signals. The reliability may e.g. be related to how well the unconstrained estimate of the current acoustic transfer function vector ($ATF_{uc,cur}$) matches the current electric input signals in a maximum likelihood sense (see e.g. [4]).

The hearing system, e.g. the processor (PRO), comprises a target signal quality estimator (TQM-E, e.g. a target signal to noise (SNR) estimator, see e.g. SNRE in FIG. 4B) for providing a target-signal-quality-measure (TQM, e.g. an SNR) indicative of a signal quality of a current target signal from said target sound source in dependence of at least one of said M electric input signals or a signal or signals originating therefrom (e.g. a beamformed signal). The target-signal-quality-measure (TQM) may be provided on a frequency sub-band level (i.e. for frequency band indices $k=1, \ldots, K$).

The hearing system, e.g. the processor (PRO), comprises a controller (CTR3) configured to determine a resulting acoustic transfer function vector (ATF*) for the user in dependence of a) the constrained estimate of the current acoustic transfer function vector ($ATF_{pd,cur}$), b) the unconstrained estimate of the current acoustic transfer function vector ($ATF_{uc,cur}$), and of c) at least one of c1) the acoustic-transfer-function-vector-matching-measure ($p(ATF_{pd,cur})$) indicative of a degree of matching of the constrained estimate ($ATF_{pd,cur}$), of c2) the acoustic-transfer-function-vector-matching-measure $p(ATF_{uc,cur})$) of the unconstrained estimate ($ATF_{uc,cur}$), and of c3) a target-sound-source-location-identifier (TSSLI) indicative of a location of, direction to, or proximity of, the current target sound source.

The hearing system, e.g. the processor (PRO), may comprise a location estimator (LOCE) connected to one or more of the electric input signals (here $X_1, \ldots, X_M$), or to a signal or signals derived therefrom. The location estimator (LOCE) may e.g. be configured to provide the target-sound-source-location-identifier (TSSLI) in dependence of an own voice detector configured to estimate whether or not (or with what probability) a given input sound (e.g. a voice, e.g. speech) originates from the voice of the user of the wearable hearing system (e.g. the hearing device), e.g. in dependence of at least one of said M electric input signals or a signal or signals originating therefrom. If own voice is detected (or detected with a high probability) in the electric input signal(s), and if own voice is assumed to be the target signal (e.g. in a communication mode of operation) the target source location is the user's mouth (and all other locations around the user can be ignored (or have less probability) in relation to determination of an appropriate current acoustic transfer function. The location estimator (LOCE) may e.g. be configured to provide the target-sound-source-location-identifier (TSSLI) in dependence of a direction of arrival estimator configured to estimate a direction of arrival of a current target sound source, e.g. in dependence of at least one of said M electric input signals or a signal or signals originating therefrom. Thereby acoustic transfer functions associated with locations within an angular range of the estimated direction of the location estimator may be associated with a higher probability than other transfer functions. The location estimator (LOCE) may e.g. be configured to provide the target-sound-source-location-identifier (TSSLI) in dependence of a proximity detector configured to estimate a distance to a current target sound source, e.g. in dependence of at least one of the M electric input signals or a signal or signals originating therefrom, or in dependence of a distance sensor or detector. Thereby appropriate acoustic transfer functions associated with locations around the user that are within a range of the estimated distance of the location estimator may be associated with a higher probability than other transfer functions.

The hearing system, e.g. the processor (PRO), comprises an audio signal processing part (SP) configured to provide the processed signal (OUT) in dependence of the resulting acoustic transfer function vector (ATF*) for the user. The signal audio signal processing part (SP) may e.g. comprise a beamformer (cf. BF in FIG. 4B). The beamformer weights and/or parameters of a single channel noise reduction unit may rely on the (personalized) resulting acoustic transfer function vector (ATF*) for the user to provide beamforming and noise reduction better adapted to the user of the hearing device or system.

The controller (CTR) in FIG. 4A, 4B is embodied in sub-units of the controller (CTR1, CTR2, CTR3) in FIG. 4C.

The hearing device (HD), e.g. a hearing aid, of FIGS. 4A, 4B and 4C comprises a forward (audio signal) path configured to process the electric input signals (($x_1, \ldots, x_M$) and ($x_1, x_2$), respectively) and to provide enhanced (processed) output signal (out) for being presented to the user. The forward path comprises A) a multitude of input transducers (here microphones ($M_1, \ldots, M_M$) and ($M_1, M_2$), respectively), B) a processor (PRO) comprising b1) respective analysis filter banks ((FB-A1, . . . , FB-AM) and (FB-A1, FB-A2)), b2) a signal processor (SP), and b3) a synthesis filter bank (FBS), and finally C) an output unit (OU), e.g. an output transducer (e.g. a loudspeaker, and/or a transmitter, e.g. a wireless transmitter) connected to each other.

The synthesis filter bank (FBS) is configured to convert a number of frequency sub-band signals (OUT) to one time-domain signal (out). The signal processor (SP) is configured to apply one or more processing algorithms to the electric input signals (e.g. beamforming and compressive amplification) and to provide a processed output signal (OUT; out) for presentation to the user via an output unit (OU), e.g. an output transducer. The output unit is configured to a) convert a signal representing sound to stimuli perceivable by the user as sound (e.g. in the form of vibrations in air, or vibrations in bone, or as electric stimuli of the cochlear nerve) or to b) transmit the processed output signal (out) to another device or system.

The processor (PRO) and the signal processor (SP) may form part of the same digital signal processor (or be independent units). The analysis filter banks (FB-A1, FB-A2), the processor (PRO), the signal processor (SP), the synthesis filter bank (FBS), the controller (CTR), the target signal quality estimator (TQME; SNR-E), the voice activity detector (VAD), the target-sound-source-location-identifier (TSSLI), and the memory (MEM [DB]) may form part of the same digital signal processor (or be independent units).

The hearing device may comprise a transceiver allowing an exchange of data with another device, e.g. a contra-lateral hearing device of a binaural hearing system, a smartphone or any other portable or stationary device or system. The database Θ may be located in the other device. Likewise, the processor PRO (or a part thereof) may be located in the other device (e.g. a dedicated processing device).

Figure 5:
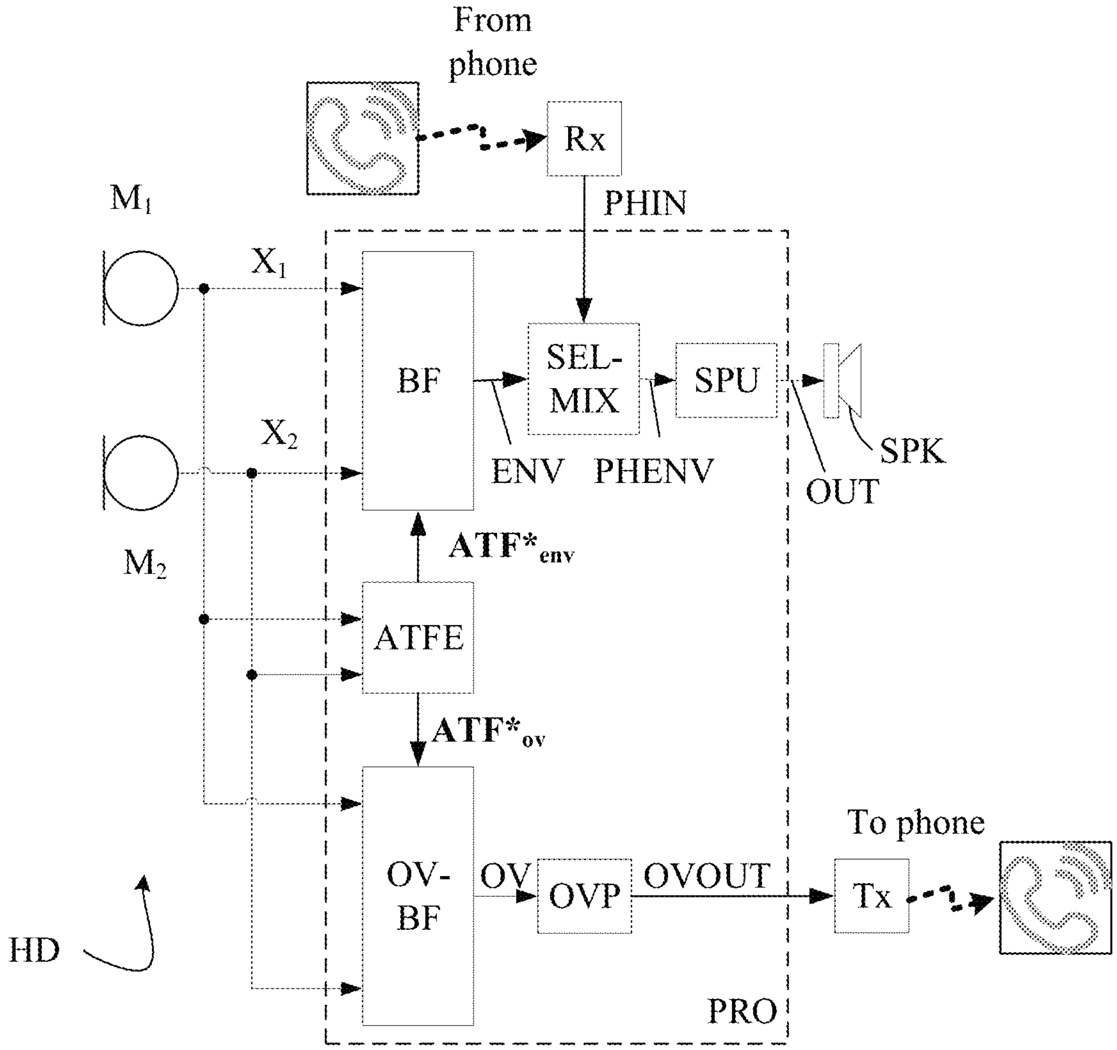
FIG. 5 shows an embodiment of a headset or a hearing aid comprising own voice estimation and the option of transmitting the own voice estimate to another device, and to receive sound from another device for presentation to the user via a loudspeaker, e.g. mixed with sound from the environment of the user.

FIG. 5 shows an embodiment of a headset or a hearing aid comprising own voice estimation and the option of transmitting the own voice estimate to another device, and to receive sound from another device for presentation to the user via a loudspeaker, e.g. mixed with sound from the environment of the user. FIG. 5 shows an embodiment of a hearing device (HD), e.g. a hearing aid, comprising two microphones ($M_1$, $M_2$) to provide electric input signals ($X_1$, $X_2$) representing sound in the environment of a user wearing the hearing device. The hearing device further comprises spatial filters (beamformers) BF and OV-BF, each providing a spatially filtered signal (ENV and OV respectively) based on the electric input signals ($X_1$, $X_2$). The spatial filter (BF) may e.g. implement a target maintaining, noise cancelling, beamformer for a target signal in the environment. The spatial filter (OV-BF) may e.g. implement an own voice beamformer directed at the mouth of the user (its activation being e.g. controlled by an own voice presence control signal, and/or a telephone mode control signal, and/or a far-end talker presence control signal, and/or a user initiated control signal). In a specific telephone mode of operation, the user's own voice is picked up by the microphones ($M_1$, $M_2$) and spatially filtered by the own voice beamformer of spatial filter (OV-BF) providing signal OV, which—optionally via own voice processor (OVP)—is fed to a transmitter (Tx) and transmitted (by cable or wireless link to a another device or system (e.g. a telephone, cf. dashed arrow denoted 'To phone' and telephone symbol). In the specific telephone mode of operation, signal PHIN may be received by a (wired or wireless) receiver (Rx) from another device or system (e.g. a telephone, as indicated by telephone symbol and dashed arrow denoted 'From Phone'). When a far-end talker is active, signal PHIN contains speech from the far-end talker, e.g. transmitted via a telephone line (e.g. fully or partially wirelessly). The signal (PHIN) from the 'far-end' telephone may be selected or mixed with the environment signal (ENV) from the spatial filter (BF) in a combination unit (here selector/mixer SEL-MIX), and the selected or mixed signal (PHENV) is fed to an output transducer (SPK) (e.g. a loudspeaker or a vibrator of a bone conduction hearing device) for presentation to the user as sound. Optionally, as shown in FIG. 5, the selected or mixed signal (PHENV) may be fed to signal processing unit (SPU) for applying one or more processing algorithms to the selected or mixed signal (PHENV) to provide the processed signal (OUT), which is then fed to the output transducer (SPK). The embodiment of FIG. 5 may represent a headset, in which case the received signal (PHIN) may be selected for presentation to the user without mixing with an environment signal. The embodiment of FIG. 5 may represent a hearing aid, in which case the received signal PHIN may be mixed with an environment signal before presentation to the user (to allow a user to maintain a sensation of the surrounding environment; the same may of course be relevant for a headset application, depending on the use-case). Further, in a hearing aid, the signal processing unit (SPU) may be configured to compensate for a hearing impairment of the user of the hearing aid.

The beamformers (BF) and (OV-BF) are connected to an acoustic transfer function estimator (ATFE) for providing the current acoustic transfer function vector (ATF*) in dependence of the current electric input signals (and possible sensors or detectors) according to the present invention. In a communication mode (e.g. telephone mode) of operation, the own-voice beamformer (OV-BF) is activated and the current acoustic transfer function vector (ATF*) is an own voice acoustic transfer function ($ATF^*_{ov}$), determined when the user speaks. In a non-communication mode of operation, the environment beamformer (BF) is activated and the current acoustic transfer function vector (ATF*) is an environment acoustic transfer function ($ATF^*_{env}$) (e.g. determined when the user does not speak). Likewise, in a communication mode wherein the environment beamformer is activated, the environment acoustic transfer function ($ATF^*_{env}$) may be determined from the electric input signals ($X_1$, $X_2$) when the user's voice is not present (e.g. when the far-end communication partner speaks).

Figure 6:
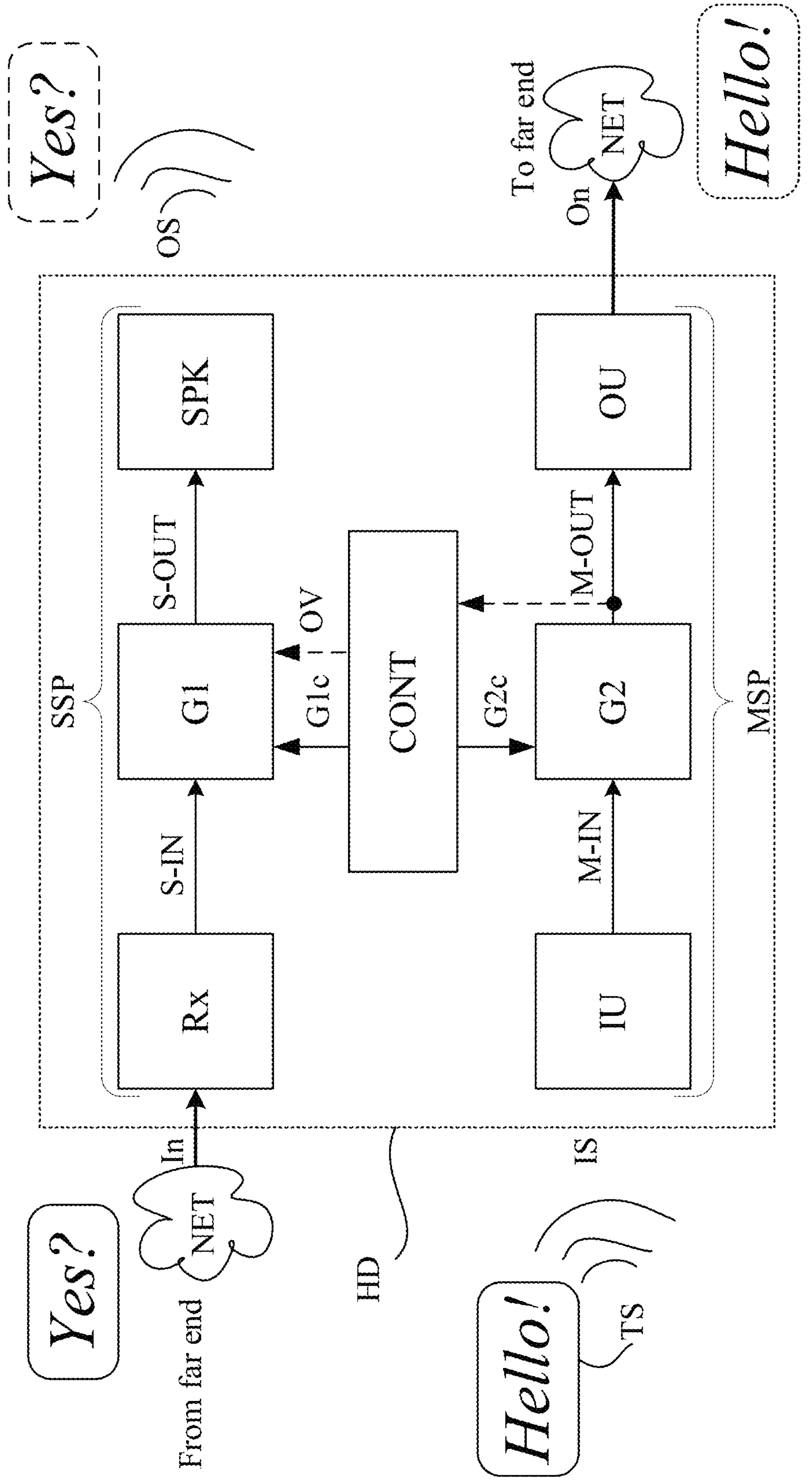
FIG. 6 shows an embodiment of a headset according to the present disclosure.

FIG. 6 shows an embodiment of a headset (HD) according to the present disclosure. The headset of FIG. 6 comprises a loudspeaker signal path (SSP), a microphone signal path (MSP), and a control unit (CONT) for dynamically controlling signal processing of the two signal paths. The loudspeaker signal path (SSP) comprises a receiver (Rx) for receiving an electric signal (In) from a remote device or system and providing it as an electrically received input signal (S-IN), an audio signal processing unit (G1) for processing the electrically received input signal (S-IN) and providing a processed output signal (S-OUT), and a loudspeaker unit (SPK) operationally connected to the audio signal processing unit (G1) and configured to convert the processed output signal (S-OUT) to an acoustic sound signal (OS) originating from the signal (In) received by the receiver (Rx). The microphone signal path (MSP) comprises an input unit (IU) comprising at least first and second microphones for converting an acoustic input sound (IS) (e.g. from a wearer of the headset) to respective electric input signals (M-IN), an audio signal processing unit (G2) for processing the electric microphone input signals (M-IN) and providing a processed output signal (M-OUT), and a transmitter unit (Tx) operationally connected to each other and configured to transmit the processed signal (M-OUT) originating from an input sound (IS) (and comprising the user's own voice) picked up by the input unit (IU) to a remote end as a transmitted signal (On). The audio signal processing unit (G2) may e.g. comprise an own voice beamformer configured to focus on the user's mouth and hence to extract the user's voice. The audio signal processing unit (G2) may e.g. comprise an acoustic transfer function estimator (ATFE) for providing the current acoustic transfer function vector ($ATF^*_j$) in dependence of the current electric input signals (and possible sensors or detectors) according to the present invention. The processed output signal (M-OUT) comprises an estimate of the user's own voice based on resulting current own voice transfer functions (ATF*ov) estimated according to the present disclosure. As indicated by the dashed arrow (denoted M-OUT) from audio signal processing unit (G2) to control unit (CONT) and dashed arrow (denoted OV) from control unit (CONT) to audio signal processing unit (G1), the user's own voice (estimated using acoustic transfer functions according to the present disclosure) may optionally be fed from the microphone signal path (MSP) to the loudspeaker signal path (SSP) to present the own voice to the user (typically having the effect that the user will adapt his/her voice in level (sometimes referred to as 'sidetone' presentation)).

The control unit (CONT) is configured to dynamically control the processing of the SSP- and MSP-signal processing units (G1 and G2, respectively), e.g. based on one or more control input signals (not shown).

The input signals (S-IN, M-IN) to the headset (HD) may be presented in the (time-) frequency domain or converted from the time domain to the (time-) frequency domain by appropriate functional units, e.g. included in receiver unit (Rx) and input unit (IU) of the headset. A headset according to the present disclosure may e.g. comprise a multitude of time to time time-frequency conversion units (e.g. one for each input signal that is not otherwise provided in a time-frequency representation, e.g. in the form of analysis filter bank units (FB-Am, m=1, . . . , M) of FIG. 4A, 4B, 4C) to provide each input signal in a number of frequency bands k and a number of time instances l (the entity (k,l) being defined by corresponding values of indices k and m being termed a TF-bin or DFT-bin or TF-unit.

Figure 7:
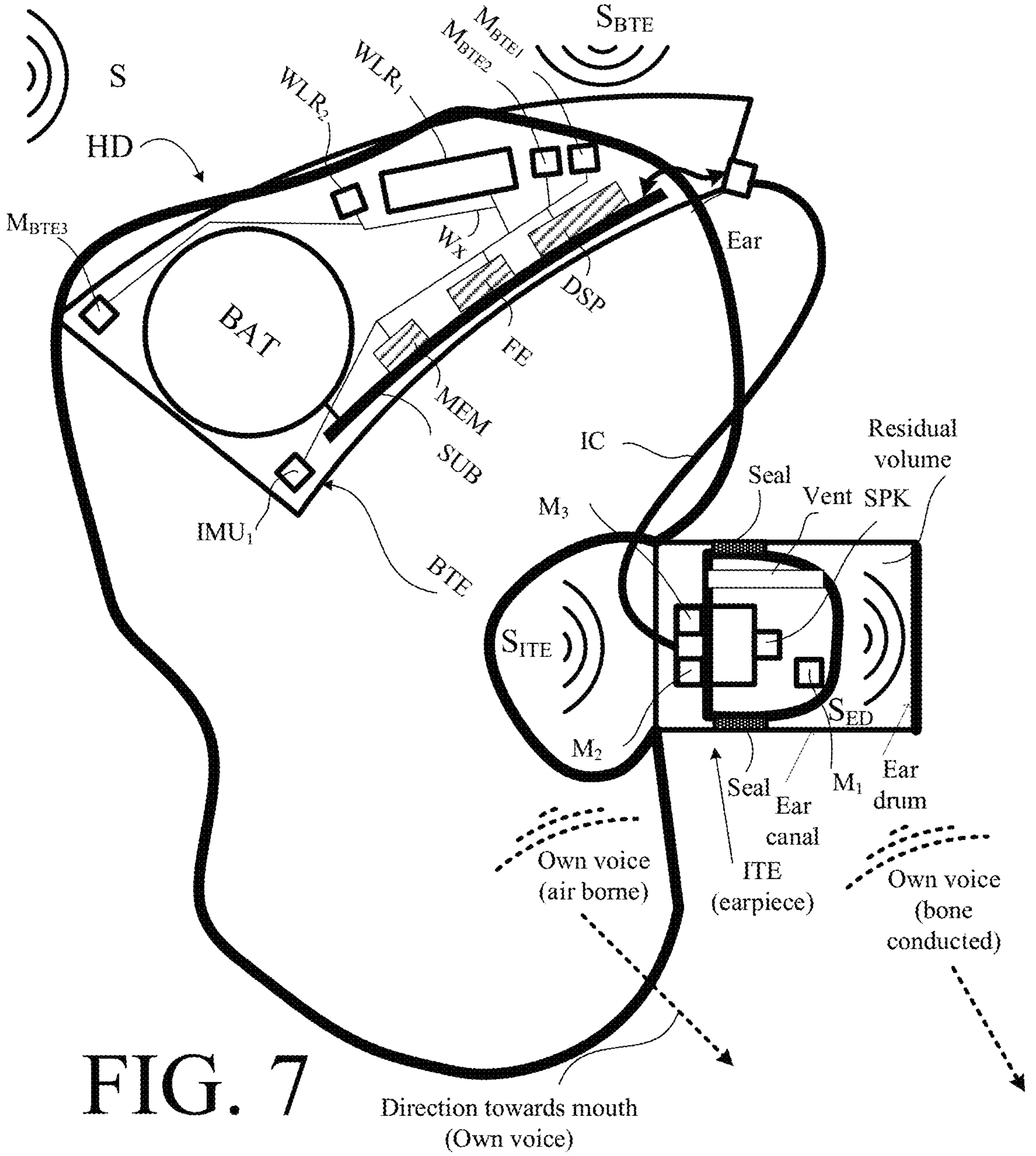
FIG. 7 shows an embodiment of a hearing aid according to the present disclosure.

FIG. 7 shows an embodiment of a hearing aid according to the present disclosure. The hearing aid (HD) is here illustrated as a particular style (sometimes termed receiver-in-the ear, or RITE, style) comprising a BTE-part (BTE) adapted for being located at or behind an ear (pinna) of a user, and an ITE-part (ITE) adapted for being located in or at an ear canal of the user's ear and comprising a loudspeaker (SPK). The BTE-part and the ITE-part are connected (e.g. electrically connected) by a connecting element (IC) and internal wiring in the ITE- and BTE-parts (cf. e.g. wiring Wx in the BTE-part). The connecting element may alternatively be fully or partially constituted by a wireless link between the BTE- and ITE-parts.

In the embodiment of a hearing device in FIG. 7, the BTE part comprises an input unit comprising three input transducers (e.g. microphones) ($M_{BTE1}$, $M_{BTE2}$, $M_{BTE3}$), each for providing an electric input audio signal representative of an input sound ($S_{BTE}$) (Originating from a sound field S around the hearing device). The input unit further comprises two wireless receivers ($WLR_1$, $WLR_2$) (or transceivers) for providing respective directly received auxiliary audio and/or control input signals (and/or allowing transmission of audio and/or control signals to other devices, e.g. a remote control or processing device). The hearing device (HD) comprises a substrate (SUB) whereon a number of electronic components are mounted, including a memory (MEM) e.g. storing the database of acoustic transfer functions according to the present disclosure. The memory may further store different hearing aid programs (e.g. parameter settings defining such programs, or parameters of algorithms, e.g. optimized parameters of a neural network, e.g. beamformer weights of one or more (e.g. an own voice) beamformer(s)) and/or hearing aid configurations, e.g. input source combinations ($M_{BTE1}$, $M_{BTE2}$, $M_{BTE3}$, $M_1$, $M_2$, $M_3$, $WLR_1$, $WLR_2$), e.g. optimized for a number of different listening situations or modes of operation. One mode of operation may e.g. be a communication mode, where the user's own voice is picked up by microphones of the hearing aid (e.g. $M_1$, $M_2$, $M_3$) and transmitted to another device or system via one of the wireless interfaces ($WLR_1$, $WLR_2$). The substrate further comprises a configurable signal processor (DSP, e.g. a digital signal processor, e.g. including a processor (e.g. PRO in FIG. 4A, 4B, 4C)) for applying a frequency and level dependent gain, e.g. providing beamforming, noise reduction, filter bank functionality, and other digital functionality of a hearing device according to the present disclosure, e.g. the acoustic transfer function estimator (ATFE). The configurable signal processor (DSP) is adapted to access the memory (MEM) and for selecting and processing one or more of the electric input audio signals and/or one or more of the directly received auxiliary audio input signals based on a currently selected (activated) hearing aid program/parameter setting (e.g. either automatically selected, e.g. based on one or more sensors, or selected based on inputs from a user interface). The mentioned functional units (as well as other components) may be partitioned in physical circuits and components according to the application in question (e.g. with a view to size, power consumption, analogue vs. digital processing, etc.), e.g. integrated in one or more integrated circuits, or as a combination of one or more integrated circuits and one or more separate electronic components (e.g. inductor, capacitor, etc.). The configurable signal processor (DSP) provides a processed audio signal, which is intended to be presented to a user. The substrate further comprises a front-end IC (FE) for interfacing the configurable signal processor (DSP) to the input and output transducers, etc., and typically comprising interfaces between analogue and digital signals. The input and output transducers may be individual separate components, or integrated (e.g. MEMS-based) with other electronic circuitry.

The hearing system (here, the hearing device HD) may further comprise a detector unit e.g. comprising one or more inertial measurement units (IMU), e.g. a 3D gyroscope, a 3D accelerometer and/or a 3D magnetometer, here denoted $IMU_1$ and located in the BTE-part (BTE). Inertial measurement units (IMUs), e.g. accelerometers, gyroscopes, and magnetometers, and combinations thereof, are available in a multitude of forms (e.g. multi-axis, such as 3D-versions), e.g. constituted by or forming part of an integrated circuit, and thus suitable for integration, even in miniature devices, such as hearing devices, e.g. hearing aids. The sensor $IMU_1$ may thus be located on the substrate (SUB) together with other electronic components (e.g. MEM, FE, DSP). One or more movement sensors (IMU) may alternatively or additionally be located in or on the ITE part (ITE) or in or on the connecting element (IC), e.g. used to pick up sound from the user's mouth (own voice).

The hearing device (HD) further comprises an output unit (e.g. an output transducer) providing stimuli perceivable by the user as sound based on a processed audio signal from the processor or a signal derived therefrom. In the embodiment of a hearing device in FIG. 6, the ITE part comprises the output unit in the form of a loudspeaker (also sometimes termed a 'receiver') (SPK) for converting an electric signal to an acoustic (air borne) signal, which (when the hearing device is mounted at an ear of the user) is directed towards the ear drum (Ear drum), where sound signal ($S_{ED}$) is provided (possibly including bone conducted sound from the user's mouth, and sound from the environment 'leaking around or through' the ITE-part (e.g. through a ventilation channel ('Vent') and into the residual volume). The ITE-part may comprise a sealing and guiding element ('Seal') for guiding and positioning the ITE-part in the ear canal (Ear canal) of the user, and for separating the 'Residual volume' from the environment. The ITE part (earpiece) may comprise a housing or a soft or rigid or semi-rigid dome-like structure.

The electric input signals (from input transducers $M_{BTE1}$, $M_{BTE2}$, $M_{BTE3}$, $M_1$, $M_2$, $M_3$, $IMU_1$) may be processed in the time domain or in the (time-) frequency domain (or partly in the time domain and partly in the frequency domain as considered advantageous for the application in question).

The hearing device (HD) exemplified in FIG. 6 is a portable device and further comprises a battery (BAT), e.g. a rechargeable battery, e.g. based on Li-Jon battery technology, e.g. for energizing electronic components of the BTE- and possibly ITE-parts. In an embodiment, the hearing device, e.g. a hearing aid, is adapted to provide a frequency dependent gain and/or a level dependent compression and/or a transposition (with or without frequency compression) of one or more frequency ranges to one or more other frequency ranges, e.g. to compensate for a hearing impairment of a user.

In the above description and examples, focus has been made on wearable hearing devices associated with a particular person. The inventive ideas of the present disclosure (to select a predetermined acoustic transfer function from a dictionary (constrained method) OR to estimate a new acoustic transfer function (un-constrained method) in dependence of a confidence parameter, e.g. regarding the quality of a current target signal, or the location of the audio source of current interest to the user) may, however, further be applied to hearing devices associated with a particular acoustic environment, e.g. of a particular location where the hearing device is located, e.g. a particular room. An example of such device may be a speakerphone configured to pick up sound from audio sources (e.g. one or more persons speaking) located in the particular room, and to (e.g. process and) transmit the captured sound to one or more remote listeners. The speakerphone may further be configured to play sound received from the one or more remote listeners to allow persons located in the particular room to hear it. Instead of being adapted to and adapting to a particular person, acoustic transfer functions of the speakerphone (or other audio device) may be adapted to the particular room.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[1] M. Zohourian, G. Enzner, and R. Martin, "Binaural Speaker Localization Integrated Into an Adaptive Beamformer for Hearing Aids," IEEE TASLP, vol. 26, no. 3, pp. 515-528, March 2018.

[2] Hao Ye and D. DeGroat, "Maximum likelihood DOA estimation and asymptotic Cramer-Rao bounds for additive unknown colored noise," IEEE Transactions on Signal Processing, vol. 43, no. 4, pp. 938-949, April 1995.

[3] S. Markovich-Golan and S. Gannot, "Performance analysis of the covariance subtraction method for relative transfer function estimation and comparison to the covariance whitening method," in IEEE Int. Conf Acoust., Speech, Signal Process. (ICASSP), 2015, pp. 544-548.

[4] P. Hoang, Z.-H. Tan, J. M. de Haan and J. Jensen, "Joint maximum likelihood estimation of power spectral densities and relative acoustic transfer function for acoustic beamforming," in IEEE Int. Conf. Acoust., Speech, Signal Process. (ICASSP), 2021 (to be published).

[5] J. Jensen and M. S. Pedersen, "Analysis of Beamformer Directed Single-Channel Noise Reduction System for Hearing Aid Applications", in IEEE Int. Conf Acoust., Speech, Signal Process. (ICASSP), 2015.

EP3413589A1 (Oticon) Dec. 12, 2018.

[Gardner and Martin; 1994] B. Gardner, K. Martin, "HRTF Measurements of a KEMAR Dummy-Head Microphone. MIT Media Lab Machine Listening Group, Technical Report #280, 1-7, 1994

[Dillon; 2001] Dillon H. (2001), Hearing Aids, Thieme, New York-Stuttgart, 2001.

EP2869599A1 (Oticon) May 6, 2015.

US20190378531A1 (Oticon) Dec. 12, 2019.

EP3236672A1 (Oticon) Oct. 25, 2017.

The invention claimed is:

1. A hearing device configured to be worn on the head at or in an ear of a user, wherein the hearing device comprises:

a processor configured to provide a processed signal in dependence of M electric input signals, each of the M electric input signals being indicative of a sound in an environment of the hearing device, and an output unit configured to provide an output signal in dependence of the processed signal, wherein the processor is configured to:

determine an unconstrained estimate of a current acoustic transfer function vector ($ATF_{uc,cur}$) in dependence of a confidence measure, wherein the confidence measure is related to current values of the M electric input signals, determine a resulting acoustic transfer function vector (ATF*) in dependence of the unconstrained estimate of the current acoustic transfer function vector ($ATF_{uc,cur}$), and provide the processed signal in dependence of the resulting acoustic transfer function vector (ATF*).

2. A hearing device according to claim 1, wherein the processor is configured to:

determine a constrained estimate of a current acoustic transfer function vector ($ATF_{pd,cur}$) in dependence of the current values of said M electric input signals and previously determined acoustic transfer function vectors ($ATF_{pd}$), and determine the resulting acoustic transfer function vector (ATF*) in dependence of the constrained estimate of the current acoustic transfer function vector ($ATF_{pd,cur}$) and the unconstrained estimate of the current acoustic transfer function vector ($ATF_{uc,cur}$).

3. A hearing device according to claim 2, wherein the processor is configured to determine the confidence measure which comprises a resulting acoustic-transfer-function-vector-matching-measure, the resulting acoustic-transfer-function-vector-matching-measure being indicative of a degree of matching of the constrained estimate and the unconstrained estimate of the current acoustic transfer function vector ($ATF_{pd,cur}$, $ATF_{uc,cur}$).

4. A hearing device according to claim 3, wherein the processor is configured to, in accordance with the resulting acoustic-transfer-function-vector-matching-measure meeting a first secondary criterion, determine the resulting acoustic transfer function vector (ATF*) as the unconstrained estimate of the current acoustic transfer function vector ($ATF_{uc,cur}$).

5. A hearing device according to claim 2, wherein the processor is configured to determine the confidence measure which comprises:

a resulting acoustic-transfer-function-vector-matching-measure indicative of a degree of matching of the constrained estimate and the unconstrained estimate of the current acoustic transfer function vector ($ATF_{pd,cur}$, $ATF_{uc,cur}$), and a target-sound-source-location-identifier indicative of a location of, or proximity of, a target sound source relative to the user, the sound comprising a target sound signal propagated from the target sound source, wherein the processor is configured to determine the resulting acoustic transfer function vector (ATF*) as the unconstrained estimate of the current acoustic transfer function vector ($ATF_{uc,cur}$) in accordance with the resulting acoustic-transfer-function-vector-matching-measure meeting a first secondary criterion and the target-sound-source-location-identifier meeting a first tertiary primary criterion.

6. A hearing device according to claim 2, wherein the sound in the environment of the hearing device comprises a target sound signal propagated from a target sound source, wherein the processor is configured to determine the confidence measure which comprises one or more of:

a target-signal-quality-measure indicative of a signal quality of a current target sound signal from the target sound source in dependence of at least one of the current values of said M electric input signals, wherein the processor is configured to determine the resulting acoustic transfer function vector (ATF*) as a mixture of the constrained estimate of the current acoustic transfer function vector ($ATF_{pd,cur}$) and the unconstrained estimate of the current acoustic transfer function vector ($ATF_{uc,cur}$) in dependence of the target-signal-quality-measure, and a resulting acoustic-transfer-function-vector-matching-measure indicative of a degree of matching of the constrained estimate and the unconstrained estimate of the current acoustic transfer function vector ($ATF_{pd,cur}$, $ATF_{uc,cur}$), wherein the processor is configured to determine the resulting acoustic transfer function vector (ATF*) as a mixture of the constrained estimate of the current acoustic transfer function vector ($ATF_{pd,cur}$) and the unconstrained estimate of the current acoustic transfer function vector ($ATF_{uc,cur}$) in dependence of the resulting acoustic-transfer-function-vector-matching-measure.

7. A hearing device according to claim 2, wherein the hearing device is configured to obtain the previously determined acoustic transfer function vectors ($ATF_{pd}$) from a database (Θ).

8. A hearing device according to claim 7, wherein the sound in the environment of the hearing device comprises a target sound signal propagated from a target sound source, wherein the processor is configured to determine the confidence measure which comprises one or more of:

a target-signal-quality-measure indicative of a signal quality of a current target sound signal from the target sound source in dependence of at least one of the current values of said M electric input signals, wherein the hearing device is configured to, in accordance with the target-signal-quality-measure meeting a second primary criterion, update the previously determined acoustic transfer function vectors ($ATF_{pd}$) by transmitting the unconstrained estimate of the current acoustic transfer function vector ($ATF_{uc,cur}$) to the database (Θ), a resulting acoustic-transfer-function-vector-matching-measure indicative of a degree of matching of the constrained estimate and the unconstrained estimate of the current acoustic transfer function vector ($ATF_{pd,cur}$, $ATF_{uc,cur}$), wherein the hearing device is configured to, in accordance with the resulting acoustic-transfer-function-vector-matching-measure meeting a second criterion meeting a second secondary criterion, update the previously determined acoustic transfer function vectors ($ATF_{pd}$) by transmitting the unconstrained estimate of the current acoustic transfer function vector ($ATF_{uc,cur}$) to the database (Θ), and target-sound-source-location-identifier indicative of a location of, or proximity of, the target sound source relative to the user, wherein the hearing device is configured to, in accordance with the target-sound-source-location-identifier meeting a second tertiary criterion, update the previously determined acoustic transfer function vectors ($ATF_{pd}$) by transmitting the unconstrained estimate of the current acoustic transfer function vector ($ATF_{uc,cur}$) to the database (Θ).

9. A hearing device according to claim 8, wherein the processor is configured to, upon transmitting the unconstrained estimate of the current acoustic transfer function vector ($ATF_{uc,cur}$) to the database (Θ), assign the unconstrained estimate of the current acoustic transfer function vector ($ATF_{uc,cur}$) to a target location ($\theta^*_j$) associated with an element ($ATF_{pd}(\theta^*_j)$) of the previously determined acoustic transfer function vectors ($ATF_{pd}$) having the smallest difference to the unconstrained estimate of the current acoustic transfer function vector ($ATF_{tr,cur}$).

10. A hearing device according to claim 2, wherein the sound in the environment of the hearing device comprises a target sound signal propagated from a target sound source, wherein the previously determined acoustic transfer function vectors ($ATF_{pd}$) comprise elements $ATF_{pd,m}$, m=1, . . . , M, being frequency dependent acoustic transfer functions representing location-dependent (θ) and frequency dependent (k) propagation of sound from a location of the target sound source to the user of the hearing device, k being a frequency index, k=1, . . . , K, where K is a number of frequency bands.

11. A hearing device according to claim 10, wherein the previously determined acoustic transfer function vectors ($ATF_{pd}$) comprise previously determined standard acoustic transfer function vectors ($ATF_{pd,std}$) for a natural or artificial person for a multitude (J) of different locations $\theta_j$, j=1, . . . , J, relative to the hearing device, when the hearing device is mounted on a head at or in an ear of said natural or artificial person.

12. A hearing device according to claim 10, wherein the previously determined acoustic transfer function vectors ($ATF_{pd}$) comprise previously determined personalized acoustic transfer function vectors ($ATF_{pd,tr}$) for the user for a multitude (J') of different locations $\theta'_j$, j=1, . . . , J', relative to the hearing device, when the hearing device is mounted on a head at or in an ear of the user.

13. A hearing device according to claim 2, wherein the processor is configured to determine a frequency of use of the previously determined acoustic transfer function vectors ($ATF_{pd}$), and wherein the hearing device is configured to rank the previously determined acoustic transfer function vectors ($ATF_{pd}$) in dependence of the frequency of use.

14. A hearing device according to claim 1, wherein the sound in the environment of the hearing device comprises a target sound signal propagated from a target sound source, wherein the processor is configured to determine the confidence measure which comprises a target-signal-quality-measure, the target-signal-quality-measure being indicative of a signal quality of a current target sound signal from the target sound source in dependence of at least one of the current values of said M electric input signals.

15. A hearing device according to claim 14, wherein the processor is configured to, in accordance with the target-signal-quality-measure meeting a first primary criterion, determine the resulting acoustic transfer function vector (ATF*) as the unconstrained estimate of the current acoustic transfer function vector ($ATF_{uc,cur}$).

16. A hearing device according to claim 1, wherein the sound in the environment of the hearing device comprises a target sound signal propagated from a target sound source, wherein the processor is configured to determine the confidence measure which comprises:

a target-signal-quality-measure indicative of a signal quality of a current target sound signal from the target sound source in dependence of at least one of the current values of said M electric input signals, and a target-sound-source-location-identifier indicative of a location of, or proximity of, the target sound source relative to the user, wherein the processor is configured to, in accordance with the target-signal-quality-measure meeting a first primary criterion and the target-sound-source-location-identifier meeting a first tertiary criterion, determine the resulting acoustic transfer function vector (ATF*) as the unconstrained estimate of the current acoustic transfer function vector ($ATF_{uc,cur}$).

17. A hearing device according to claim 1, wherein the hearing device comprises a hearing aid or a headset.

18. A hearing device according to claim 17, wherein the hearing aid comprises an air-conduction type hearing aid, or a bone-conduction type hearing aid.

* * * * *